United States Patent
Lin et al.

(10) Patent No.: US 7,403,658 B2
(45) Date of Patent: Jul. 22, 2008

(54) DIRECT HOMOGRAPHY COMPUTATION BY LOCAL LINEARIZATION

(75) Inventors: Zhouchen Lin, Beijing (CN); Liyong Chen, Beijing (CN); Yingnong Dang, Beijing (CN); Jian Wang, Hangzhou Zhejiang Province (CN)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 11/106,725

(22) Filed: Apr. 15, 2005

(65) Prior Publication Data

US 2006/0232569 A1    Oct. 19, 2006

(51) Int. Cl.
*G06K 9/62* (2006.01)
(52) U.S. Cl. ........................ 382/209; 345/179
(58) Field of Classification Search ............... 382/209
See application file for complete search history.

(56) References Cited

U.S. PATENT DOCUMENTS

| | | | | |
|---|---|---|---|---|
| 6,580,424 | B1 * | 6/2003 | Krumm | 345/419 |
| 6,975,334 | B1 * | 12/2005 | Barrus | 345/632 |
| 7,003,150 | B2 * | 2/2006 | Trajkovi | 382/154 |
| 2003/0086602 | A1 * | 5/2003 | Trajkovic | 382/154 |
| 2004/0189674 | A1 * | 9/2004 | Zhang et al. | 345/629 |
| 2004/0218830 | A1 * | 11/2004 | Kang et al. | 382/274 |

OTHER PUBLICATIONS

Guerrero J.J., Sagues C., 2001, IX Spanish Symposium on Pattern Recognintion and Image Analysis, V04, pp. 233-240.*

* cited by examiner

*Primary Examiner*—Samir A. Ahmed
*Assistant Examiner*—Aklilu k Woldemariam
(74) *Attorney, Agent, or Firm*—Workman Nydegger

(57) ABSTRACT

A method and apparatus for determining a homography between an image and an expected image is described. The homography accounts for differences in perspective of a camera viewing an objective plane of the image, in some examples, a paper with information on it.

21 Claims, 27 Drawing Sheets

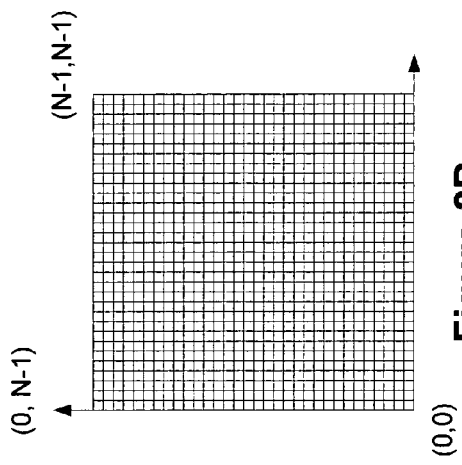
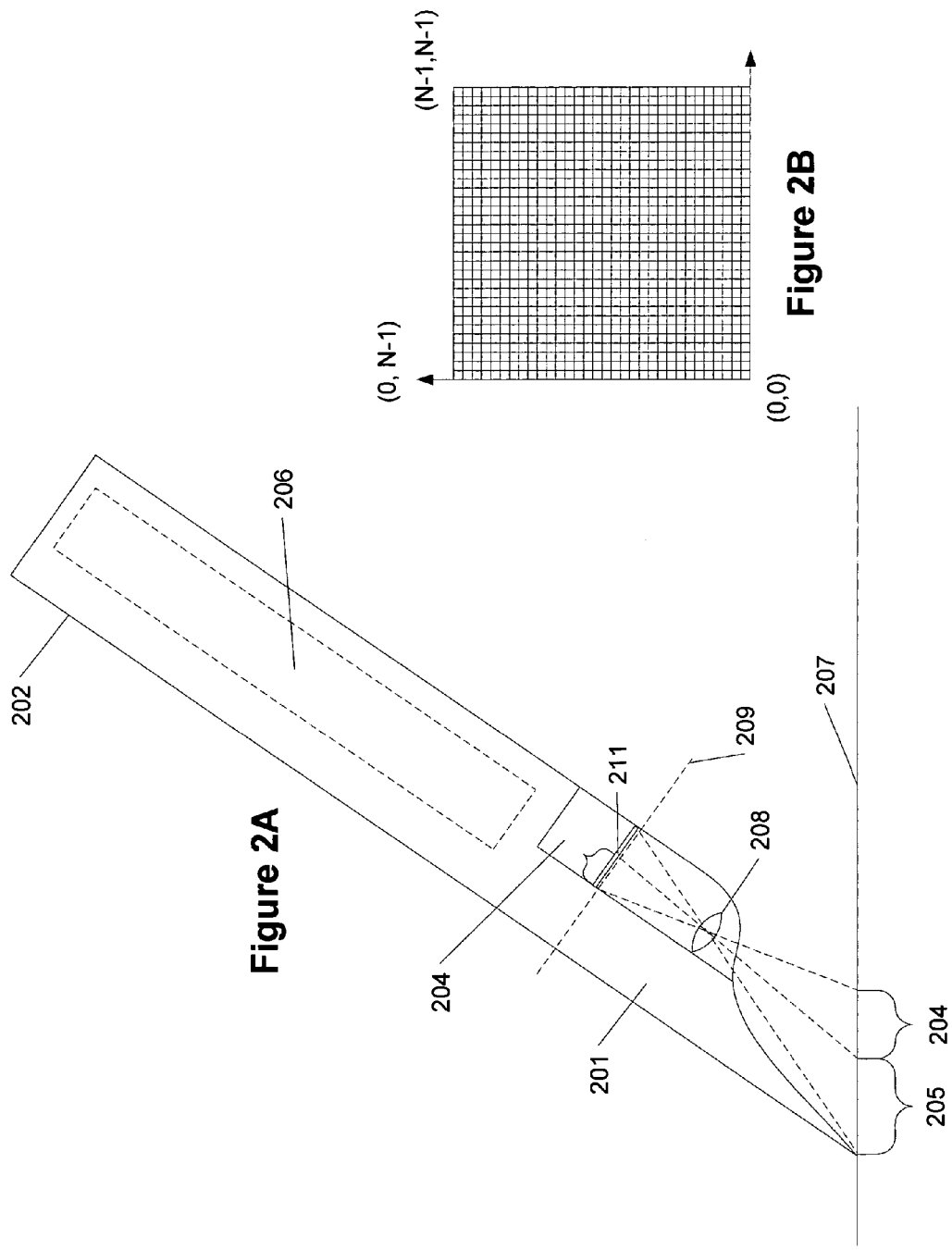

Regions of Neighboring Effective EIC Pattern Pixels

DIRECT HOMOGRAPHY COMPUTATION BY LOCAL LINEARIZATION

BACKGROUND OF THE INVENTION

1. Field of the Invention

Aspects of the present invention relate to modifying a captured image. More particularly, aspects of the invention relate to determining a homography matrix to correlate received information with expected information.

2. Description of Related Art

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user.

One technology that can help users is an image-capturing pen, where the pen attempts to determine the location of the pen's tip based on a captured image. Conventional image processing system poorly addresses image skewing based on non-perpendicular pen capturing angles. An improved system and method for transforming images to allow easier extraction of embedded codes is needed.

Further, issues exist with respect to correlating received information (for example, from a lens system of a camera) with expected information. In situations where one increases magnification of a lens of a camera (via zooming for example), there may be an issue with the level of distortion present in the received image.

BRIEF SUMMARY OF THE INVENTION

Aspects of the invention address one or more problems described above, thereby providing improved image analysis for obtaining a homography matrix.

BRIEF DESCRIPTION OF THE DRAWINGS

Aspects of the present invention are illustrated by way of example and not limited in the accompanying figures in which like reference numerals indicate similar elements.

FIGS. 2A and 2B show an image-capturing pen and a grid in accordance with aspects of the present invention.

DETAILED DESCRIPTION OF THE INVENTION

Figure 1:
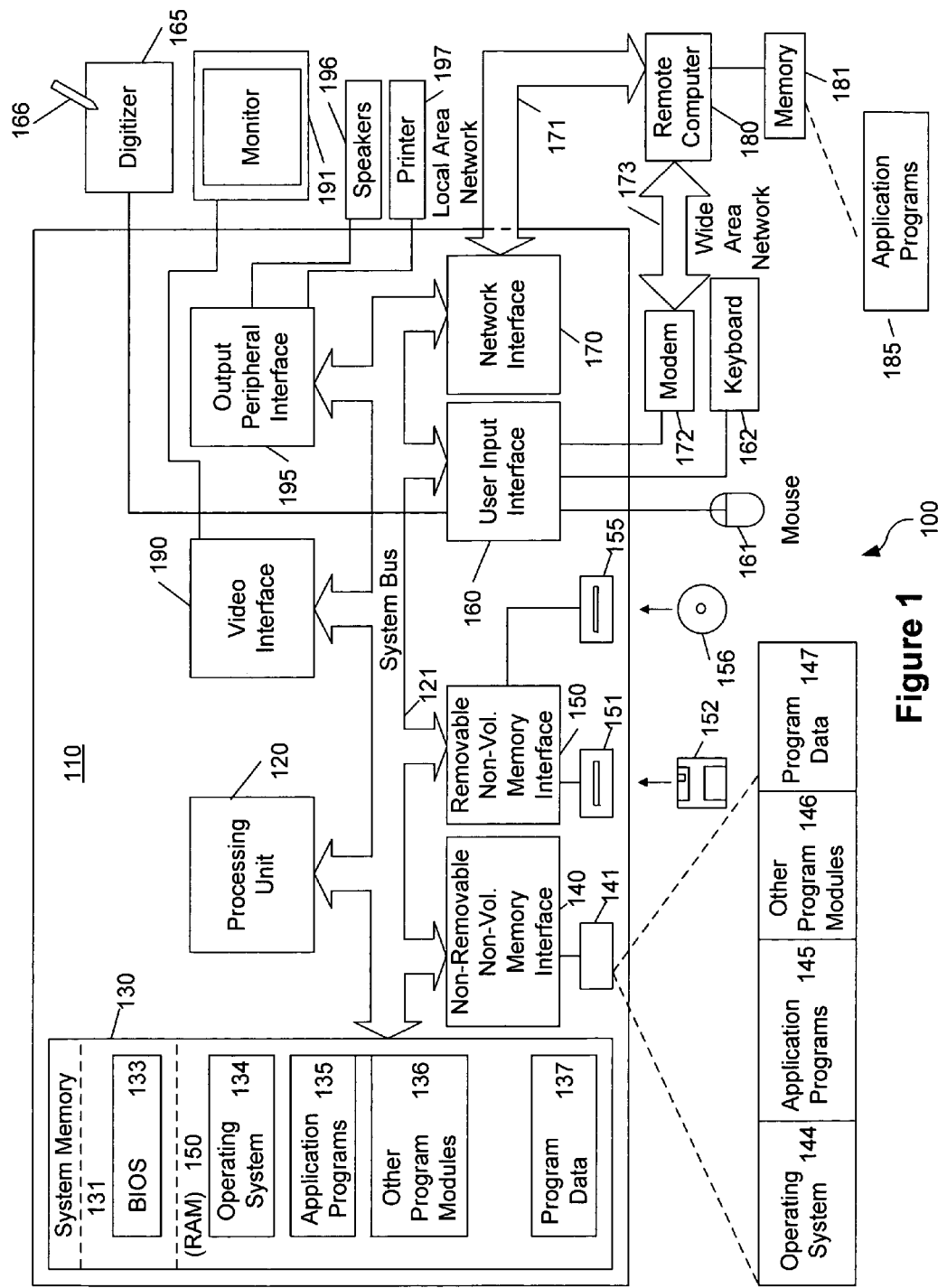
FIG. 1 shows a general-purpose computing environment that may support aspects of the present invention.

Aspects of the present invention relate to analyzing an image to obtain embedded codes.

It is noted that various connections are set forth between elements in the following description. It is noted that these connections in general and, unless specified otherwise, may be direct or indirect and that this specification is not intended to be limiting in this respect.

The following description is divided into sections to assist the reader. The following sections include: overview; terms; general-purpose computing environment; image capturing pen; overview of image analysis for obtaining codes; feature extraction; symbol segmentation; and further homography determination.

Overview

Aspects of the invention relate to determining a correlation between a received image and an expected image. Homography computation, i.e., finding the transform from the captured image to the paper, is one aspect of a camera-enabled pen. A camera-enabled pen can determine its position on papers by reading the codes printed on papers. This allows strokes made on paper to be electronically captured. Aspects of homography computation include:

a. Helping detect underlying grids of printed codes, so that printed bits in the codes can be extracted for decoding. An accurate homography can help extract more correct bits so that the decoding can be faster with less random errors (and, therefore, additional processing of a received image).

b. Helping map the position of the captured image to the pentip. Accurate homography can help reconstruct the strokes with higher fidelity.

Besides the requirement on accuracy, the speed of homography computation is also relevant. In some situations, the camera of a camera-enabled pen can capture about 100 frames per second. Considering other preprocessing and decoding steps, this roughly equates to less than 10 ms for a homography computation for each frame.

The following describes a process for determining a homography computation. With respect to images of codes on paper where the codes are in straight lines, this provides a mapping such that the grids on the paper are mapped to those in the image and the deviation is minimized. In one aspect, this approach makes use of the global structural constraints at best. Moreover, a local linearization method ensures that the convergence to the solution is fast.

Aspects of the present invention relate to determining homography from two groups of lines. The lines in each group are parallel to each other and the two groups are almost orthogonal to each other. The following approximates the grids in the image with parallel lines. The homography H has been initialized with an affine transform H0. The following describes a process to make the homography more accurate because the grids in the image are usually the perspective view of those on the paper. Under such a situation, lines in each group of the grids are not parallel to each other.

Terms

Pen Any writing implement that may or may not include the ability to store ink. In some examples, a stylus with no ink capability may be used as a pen in accordance with embodiments of the present invention Camera An image capture system that may capture an image from paper, a computer display, or any other medium EIC Symbol Array The EIC symbol array is formed by EIC symbols in place of the bits of the m-array representing X, Y position. Represents the physical space covered by the m-array representing X, Y position. EIC symbol array can be allocated to pages of a document.

Grid The grid is a set of lines formed by EIC dots in EIC symbol array.

Perspective Transform A perspective transform is a planar transform that is a perspective projection. With a perspective transform, a line is still a line. Parallel lines may not be parallel anymore. Instead, they may appear to converge to a vanishing point.

Homography Matrix A homography matrix is a matrix that defines a spatial transformation from one space plane to another. EIC pattern analysis obtains a homography matrix describing the perspective transform from grid to image. Input of EIC pattern analysis is normalized image and effective EIC pattern mask. Output is a homography matrix that describes the perspective transform from grid to image. Grid lines in image are obtained. Grid cells thus obtained are referred to as effective EIC symbols.

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 150. A basic input/output system 133 (BIOS), containing the basic routines that help to transfer information between elements within computer 110, such as during start-up, is typically stored in ROM 131. RAM 150 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 196 and printer 197, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 121 by any technique including wirelessly. Also, the pen 166 may have a camera associated with it and a transceiver for wirelessly transmitting image information captured by the camera to an interface interacting with bus 121. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form. The displayed form may be printed paper (or other physical medium) or may be a display projecting the encoded data stream in conjunction with another image or set of images. For example, the encoded data stream may be represented as a physical encoded image on the paper or an encoded image overlying the displayed image or may be a physical encoded image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing the location of the camera, the system can track movement of the stylus being controlled by the user.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 is 32×32 pixels (where N=32). Accordingly, FIG. 2B shows a field of view of 32 pixels long by 32 pixels wide. The size of N is adjustable based on the degree of image resolution desired. Also, while the field of view of the camera 203 is shown as a square for illustrative purposes here, the field of view may include other shapes as is known in the art.

The input to the pen 201 from the camera 203 may be defined as a sequence of image frames $\{I_i\}$, i=1, 2, ..., A, where Ii is captured by the pen 201 at sampling time ti. The selection of sampling rate is due to the maximum motion frequency of pen tip, which may be the same as the frequency of the hand when one writes. The frequency is known as to be from 0 up to 20 Hz. By the Nyquist-Shannon sampling theorem, the minimum sampling rate should be 40 Hz, typically 100 Hz. In one example, the sampling rate is 110 Hz. The size of the captured image frame may be large or small, depending on the size of the document and the degree of exactness required. Also, the camera image size may be determined based on the size of the document to be searched.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211. Because the transformation from the location of the virtual pen tip 212 (represented by $L_{virtual-pentip}$) to the location of the real pen tip 202 (represented by $L_{pentip}$), one can determine the location of the real pen tip in relation to a captured image 210.

The following transformation $F_{S \to P}$ transforms the image captured by camera to the real image on the paper:

$$L_{paper} = F_{S \to P}(L_{Sensor}).$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip}).$$

The transformation $F_{S \to P}$ may be referred to as a perspective transformation, which approximates $F_{S \to P}$ as:

$$F'_{S \to P} = \left\{ \begin{array}{ccc} s_x \cos\theta, & s_y \sin\theta, & 0 \\ -s_x \sin\theta, & s_y \cos\theta, & 0 \\ 0, & 0, & 1 \end{array} \right\},$$

in which $\theta$, $s_x$, and $s_y$ are the rotation and scale of two orientations of the pattern captured at location 204. Further, one can refine $F'_{S \to P}$ to $F_{S \to P}$ by matching the captured image with the corresponding background image on paper. "Refine" means to get a more precise perspective matrix $F_{S \to P}$ (8 parameters) by a kind of optimization algorithm referred to as a recursive method. The recursive method treats the matrix $F'_{S \to P}$ as the initial value. $F_{S \to P}$ describes the transformation between S and P more precisely than $F'_{S \to P}$.

Next, one can determine the location of virtual pen tip by calibration.

One places the pen tip 202 on a known location $L_{pentip}$ on paper. Next, one tilts the pen, allowing the camera 203 to capture a series of images with different pen poses. For each image captured, one may receive the transform $F_{S \to P}$. From this transform, one can obtain the location of the virtual image of pen tip $L_{virtual-pentip}$:

$$L_{virtual-pentip} = F_{P \to S}(L_{pentip}),$$

and, $$F_{P \to S} = [F_{S \to P}]^{-1}.$$

By averaging the $L_{virtual-pentip}$ received from every image, an accurate location of the virtual pen tip $L_{virtual-pentip}$ may be determined.

The location of the virtual pen tip $L_{virtual-pentip}$ is now known. One can also obtain the transformation $F_{S \to P}$ from image captured. Finally, one can use this information to determine the location of the real pen tip $L_{pentip}$:

$$L_{pentip} = F_{S \to P}(L_{virtual-pentip}).$$

Overview of Image Analysis for Obtaining Codes

Figure 3:
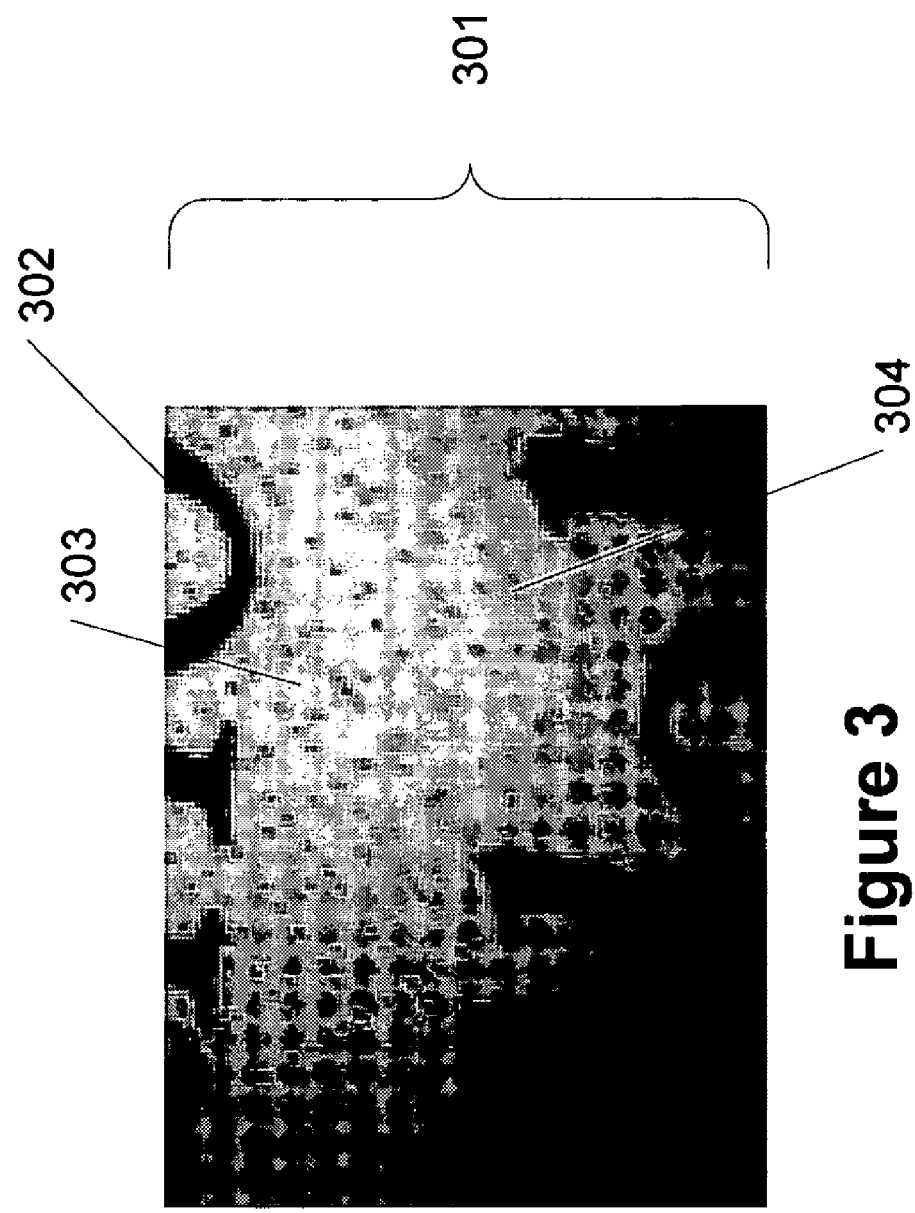
FIG. 3 shows an illustrative image captured by a camera associate with a pen in accordance with aspects of the present invention.

Most pens use ink. Some pens also include a camera to capture an image. The image may be used to determine the location of the pen tip. In accordance with aspects of the present invention, some systems can determine the location of the pen tip based on embedded codes that are captured by the camera. FIG. 3 shows an image 301 captured by a pen.

Different embedded codes may be used. For instance, codes comprising a combination of dots arranged along a grid may be used. Alternatively, a maze of perpendicular lines may form the embedded interaction codes. As shown in FIG. 3, image 301 includes blank areas 303 and EIC dots or lines or other shapes (referred to generally as "elements") 304. The EIC elements may or may not be captured with existing symbols, letters, or other information 302.

Figure 4:
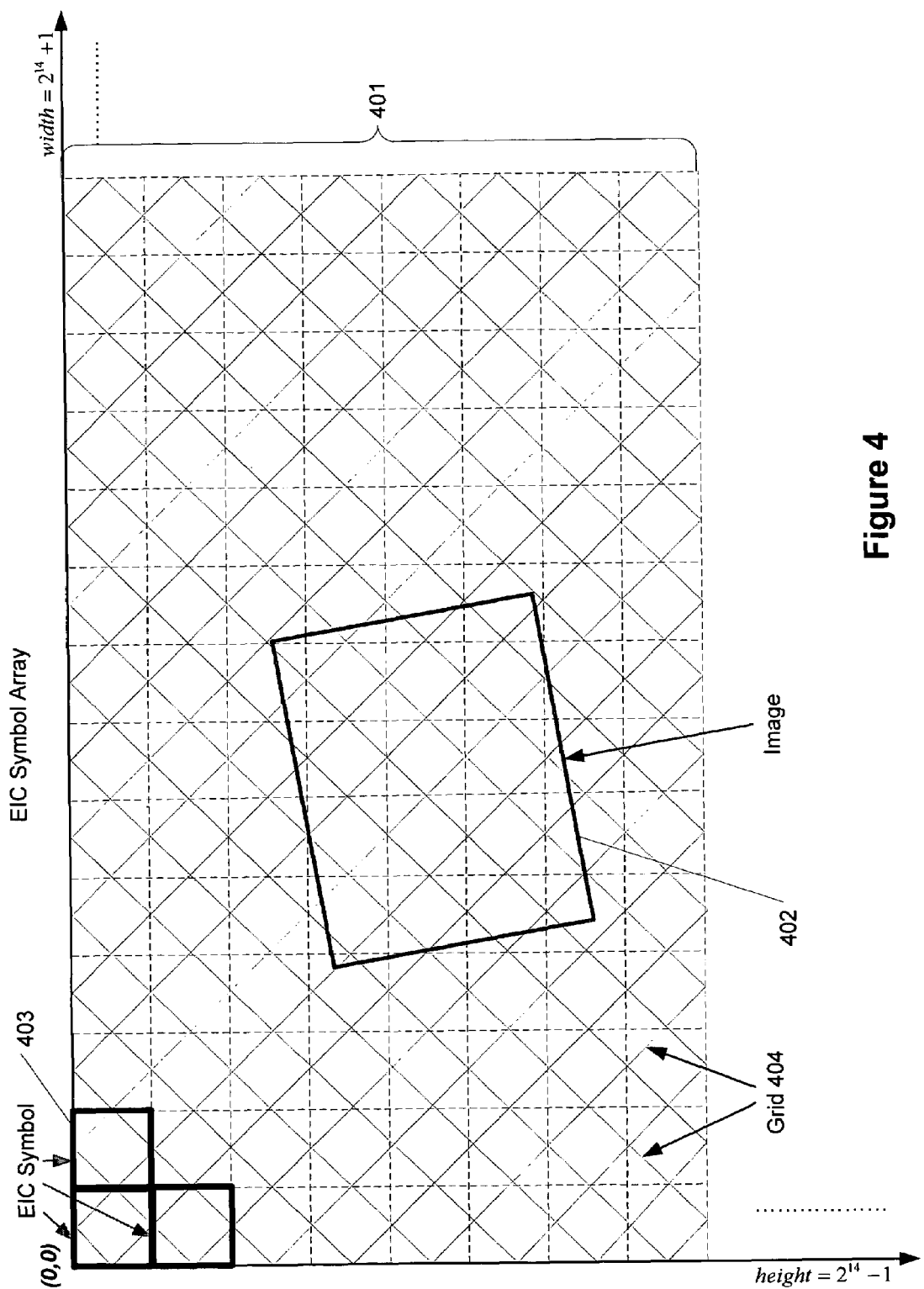
FIG. 4 shows an array of embedded interaction codes in accordance with aspects of the present invention.

In the illustrative examples shown herein, the EIC elements lie on grid lines in EIC symbol array. FIG. 4 shows an array 401 of EIC elements arranged into symbols 403 that have the EIC elements located on gridlines 404. An image 402 is captured by a camera from FIG. 2. The EIC symbols 403 images of EIC dots can be analyzed to find the corresponding grid lines 404 in image 402. If the grid lines 404 in the image 402 are found, the corresponding EIC symbols 403 can be identified and the image 402 located within array 401. Here, array 401 is shown with a height of $2^{14}-1$ and a width of $2^{14}+1$. The size of the array can vary, of course, and the resulting information provided in each EIC symbol 403 (where the smaller the array, the less information needed in EIC symbols to locate the image 402 in the array 401).

An m-array may be used to represent X, Y position in an array and multiple m-arrays may be used to represent metadata. These multiple m-arrays may be encoded in EIC symbols. In each EIC symbol, one bit from each m-array may be encoded. EIC symbols in place of the bits of the m-array representing X, Y position form an EIC symbol array (visually, the tiling of EIC symbols forms the EIC pattern). FIG. 4 shows an EIC symbol array 401 (of EIC symbol 8-a-16, in an m-array with the order of 28).

EIC pattern analysis includes two main steps. First, images may be processed to improve contrast or other preprocessing. Next, features of an effective EIC pattern in the image are analyzed. A digital pen as shown in FIG. 2 may be used. The pen is assumed to capture images from a plane. The spatial transform converts the plane to a resulting image (which is also assumed to be a plane). This transformation may be a perspective transform. Here, an effective EIC pattern in image is expected to lie on grid lines 404 that are a perspective transform of the grid lines in EIC symbol array. The perspective transform is first assumed to be an affine transform (i.e. evenly spaced parallel lines are kept evenly spaced and parallel, but perpendicular lines may not be perpendicular anymore). Rotation, scale and translation of the affine transform are estimated from analyzing effective EIC pattern in image. The perspective transform can then be obtained by fitting an effective EIC pattern to affine transformed grid lines. A homography matrix that describes the perspective transform from grid lines in EIC symbol array to image, $H_{Grid \to image}$, is obtained.

Figure 5:
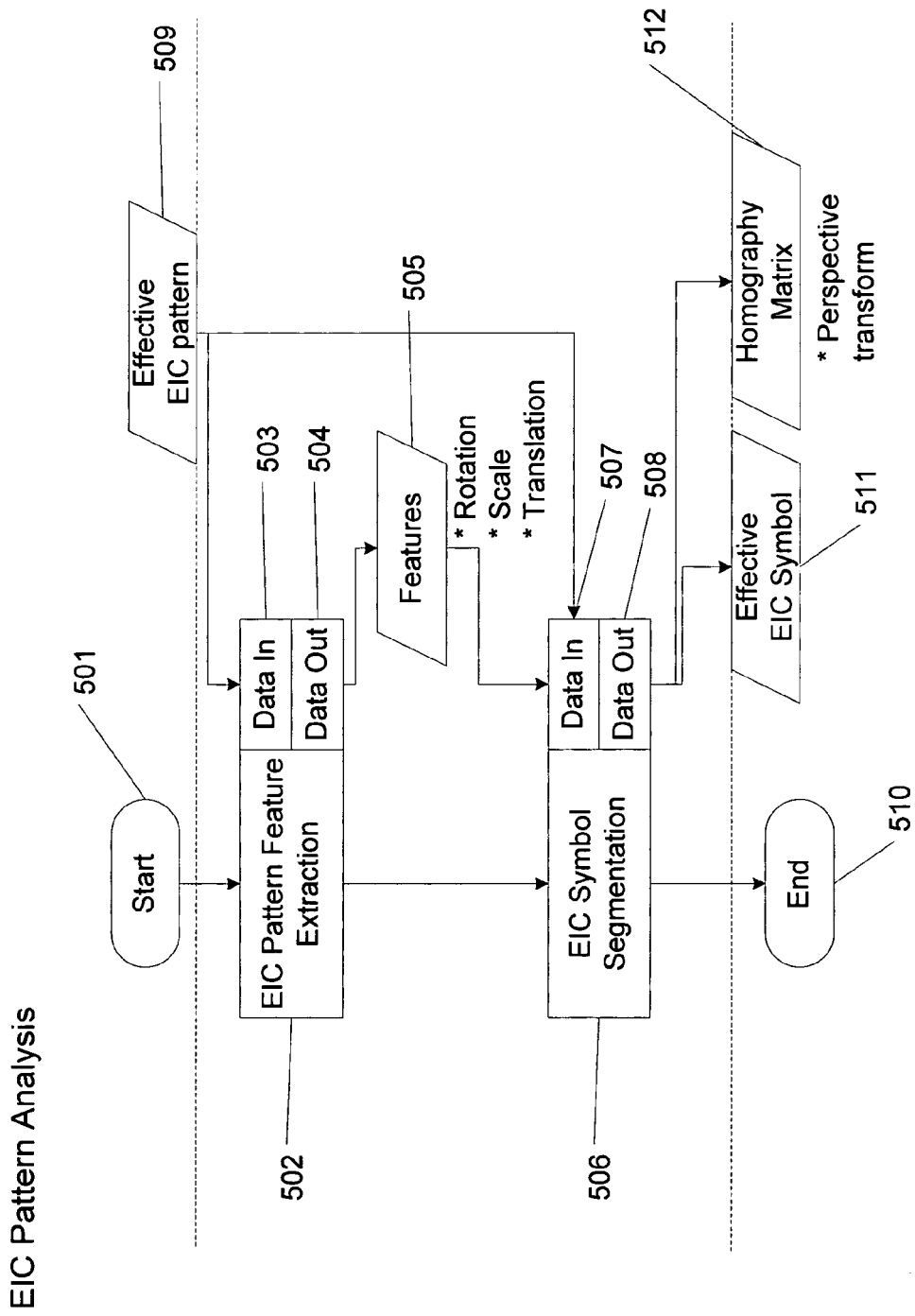
FIG. 5 shows a process for performing pattern analysis in accordance with aspects of the present invention.
Figure 6:
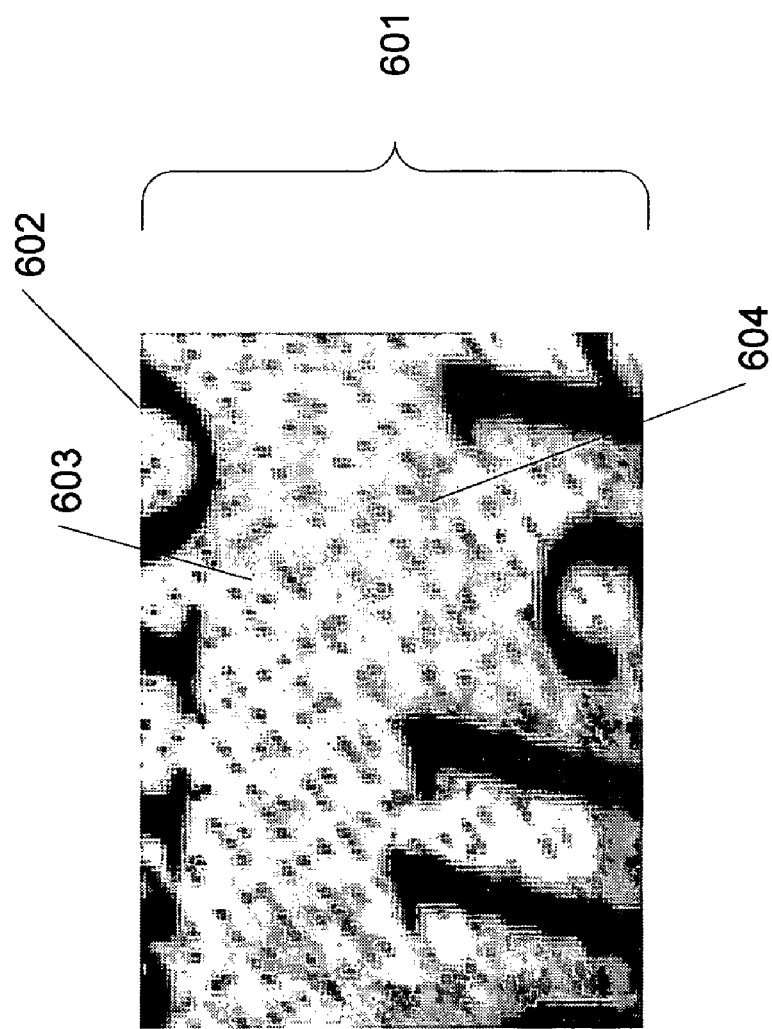
FIG. 6 shows a normalized image with a pattern mask and document content mask applied in accordance with aspects of the present invention.

The above process is referred to as an EIC pattern analysis. FIG. 5 shows the workflow of EIC pattern analysis. In step 501, the process starts. In step 502, EIC pattern feature extraction is performed using data from an effective EIC pattern 509. The effective EIC pattern is shown in FIG. 6 with image 601, existing image data (if relevant) 602, blank space 603 and EIC elements 604. Data output 504 from the EIC pattern feature extraction provides features 505 with information relating to rotation, scale, and translation information.

Figure 7:
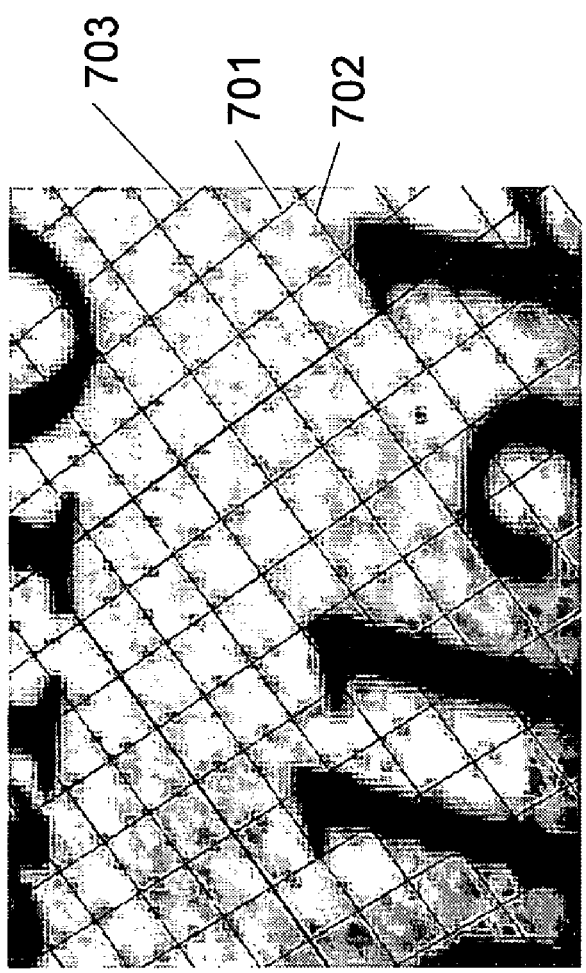
FIG. 7 shows effective embedded interaction code symbols in accordance with aspects of the present invention.

Next, in step 506, input data 507 (namely features 505) is processed by EIC symbol segmentation. Data output 508 from EIC symbol segmentation 506 results in an effective EIC symbol 511 and homography matrix (having a perspective transformation) 512 as shown in FIG. 7 with EIC symbols 701, first grid lines 702 and second grid lines 703. The two primary steps 502 and 506 are described below.

Feature Extraction

EIC pattern feature extraction obtains an affine transform to convert a grid to an image by analyzing an effective EIC pattern in a captured image. An affine transform keeps evenly spaced parallel lines evenly spaced and parallel, but perpendicular lines may not be perpendicular anymore. This step obtains the rotation, scale (distance between parallel lines) and translation (distance between the origins) of the affine transform. Output of this step is a homography matrix that describes the affine transform.

First, the system finds two main directions of EIC symbols. This step looks at all the directions formed by pairs of connected effective EIC pattern regions and finds two directions that occur the most often.

First, given effective EIC pattern mask, regions $R_t$, where $t=1, 2, \ldots, T$, of pixels $(x_i, y_i)$ are identified:

$R_t = \{(x_i, y_i) | \text{EIC Pattern Mask } (x_i, y_i)=1, (x_i, y_i) \text{ are neighbors}\}$.

Figure 8:
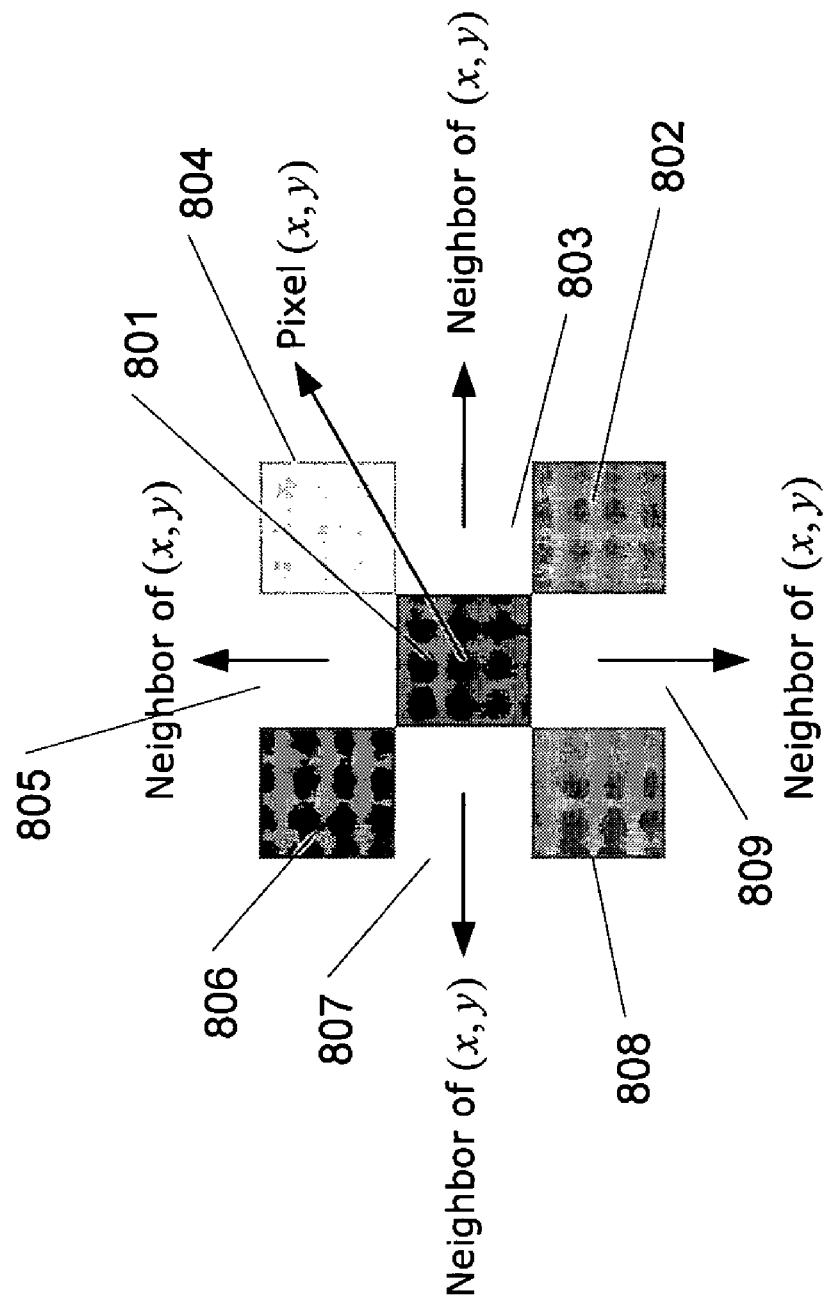
FIG. 8 shows neighboring pixels in accordance with aspects of the present invention.

Two pixels are neighbors if they are directly below, above or next to each other. FIG. 8 shows neighboring pixels in accordance with aspects of the present invention. Pixel 801 is a given pixel (x,y). Pixels 803, 805, 807, and 809 are neighboring pixels of (x,y). Here, these are shown in the cardinal directions (up, down, left, right) of pixel 801. Pixels 804, 806, 808, and 802 are on the diagonals from pixel 801.

Figure 9:
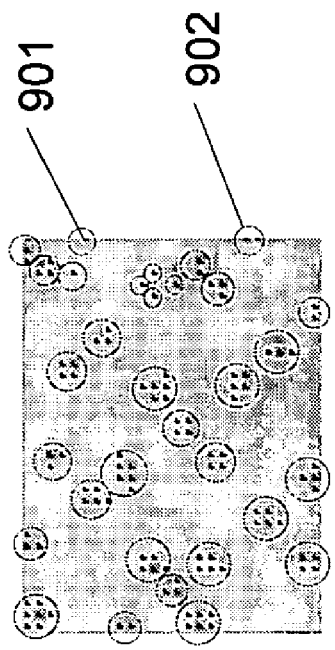
FIG. 9 shows regions of neighboring effective EIC pattern pixels in accordance with aspects of the present invention.

FIG. 9 shows examples of these regions with pixel 901 and surrounding regions 902, for instance.

Next, gray-level centroids of the regions are identified. For each region $R_t$, where $t=1, 2, \ldots, T$, gray-level centroid $(\bar{x}_t, \bar{y}_t)$ is:

$$\bar{x}_t = \frac{1}{\sum_{i=0}^{N_t} G(x_i, y_i)} \sum_{i=0}^{N_t} (x_i \cdot G(x_i, y_i))$$

$$\bar{y}_t = \frac{1}{\sum_{i=0}^{N_t} G(x_i, y_i)} \sum_{i=0}^{N_t} (y_i \cdot G(x_i, y_i)),$$

where $(x_i, y_i)$ is the pixel in region $R_t$, $G(x_i, y_i)$ is the gray-level of the pixel, and $N_t$ is the total number of pixels in region $R_t$.

Figure 10:
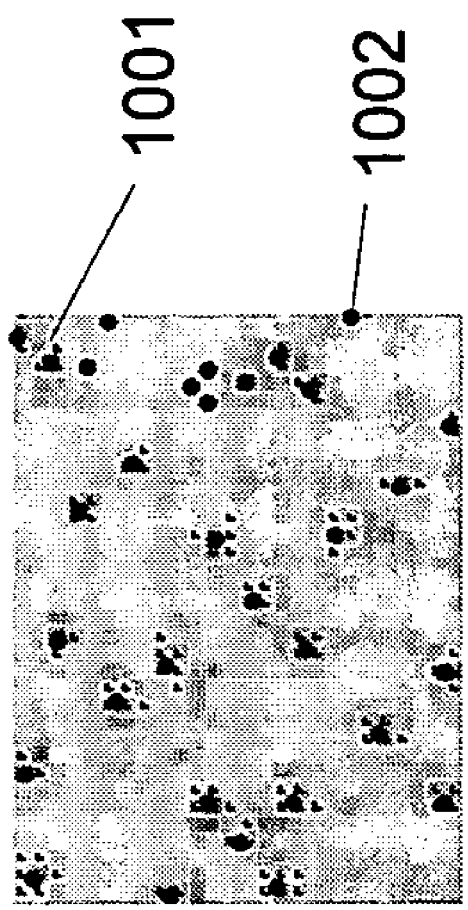
FIG. 10 shows centroids of the regions of FIG. 9 in accordance with aspects of the present invention.

FIG. 10 shows centroids 1002 of the regions 1001.

Figure 11:
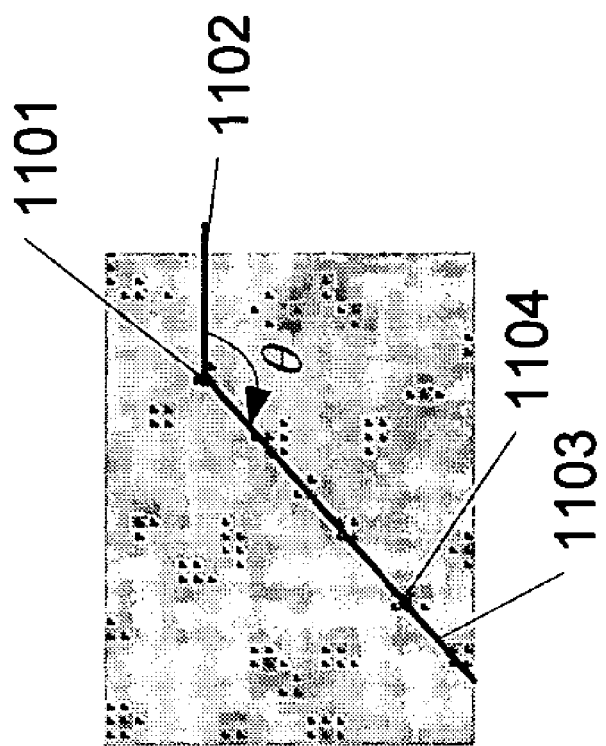
FIG. 11 shows directions formed by a pair of regions in accordance with aspects of the present invention.

Third, for each pair of regions, and $R_u$ and $R_v$, a direction of the pair is obtained:

$$\theta_{u,v} = \arctan\left(\frac{\bar{y}_u - \bar{y}_v}{\bar{x}_u - \bar{x}_v}\right),$$

where $0 \leq \theta_{u,v} < 180$. FIG. 11 shows the definition of $\theta$. Here, $\theta$ is defined as a rotation about point 1101 from horizontal line 1102 to a line 1103 connecting centroids 1101 with another centroid 1104. The determination of angle $\theta$ may be performed for all centroids from all centroids in the capture image.

Figure 12:
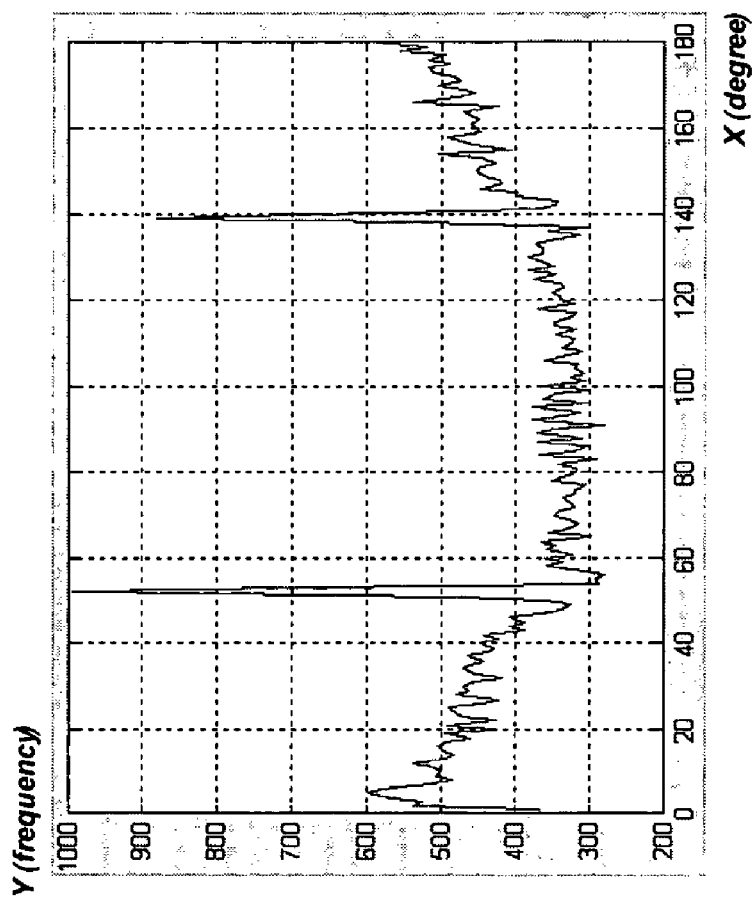
FIG. 12 shows a histogram of directions in accordance with aspects of the present invention.

Once all the directions are obtained, a histogram of directions can be created. The X axis is $\theta$. The Y axis is the frequency count of $\theta$. FIG. 12 shows the histogram where the number of times a centroid was on line 1103 for a specific angle $\theta$.

Figure 13:
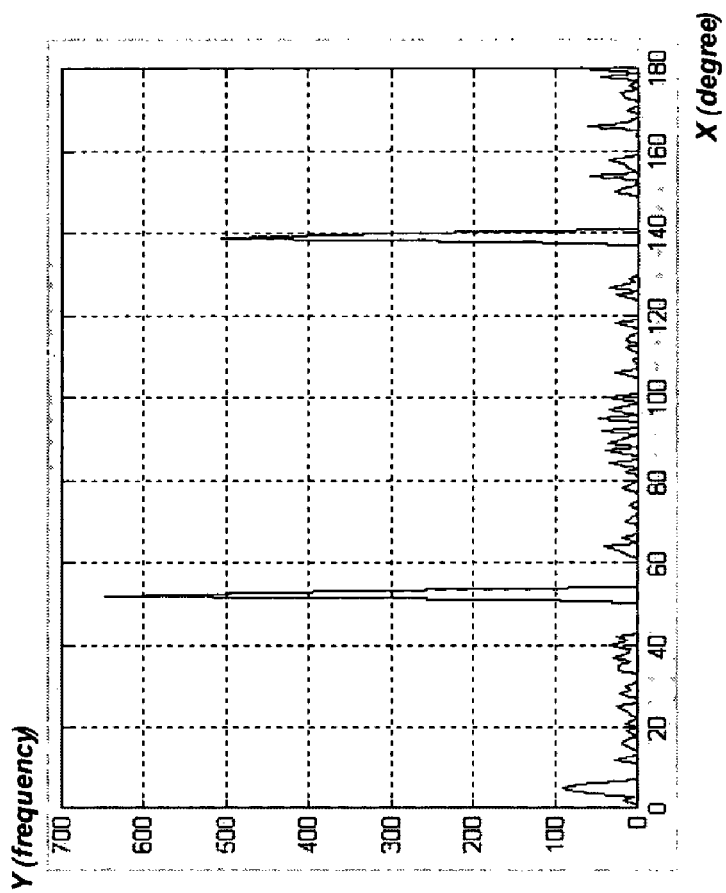
FIG. 13 shows a normalized histogram of directions in accordance with aspects of the present invention.

Next, as shown in FIG. 13, the histogram is first normalized using template $[-0.1, -0.1, -0.1, -0.1, -0.1, 0, 0, 0, 1, 0, 0, 0, -0.1, -0.1, -0.1, -0.1, -0.1]$. That is, for every x, where x=0, 1, ..., 179, $$Y(x) = \sum_{i=0}^{16} (\text{template}[i] \cdot Y(\text{mod}(x + i - 8, 180))).$$

mod(x,y) is a function that returns the positive remainder of x divided by y. For example, mod(3,2)=1, mod(−3,2)=1.

Figure 14:
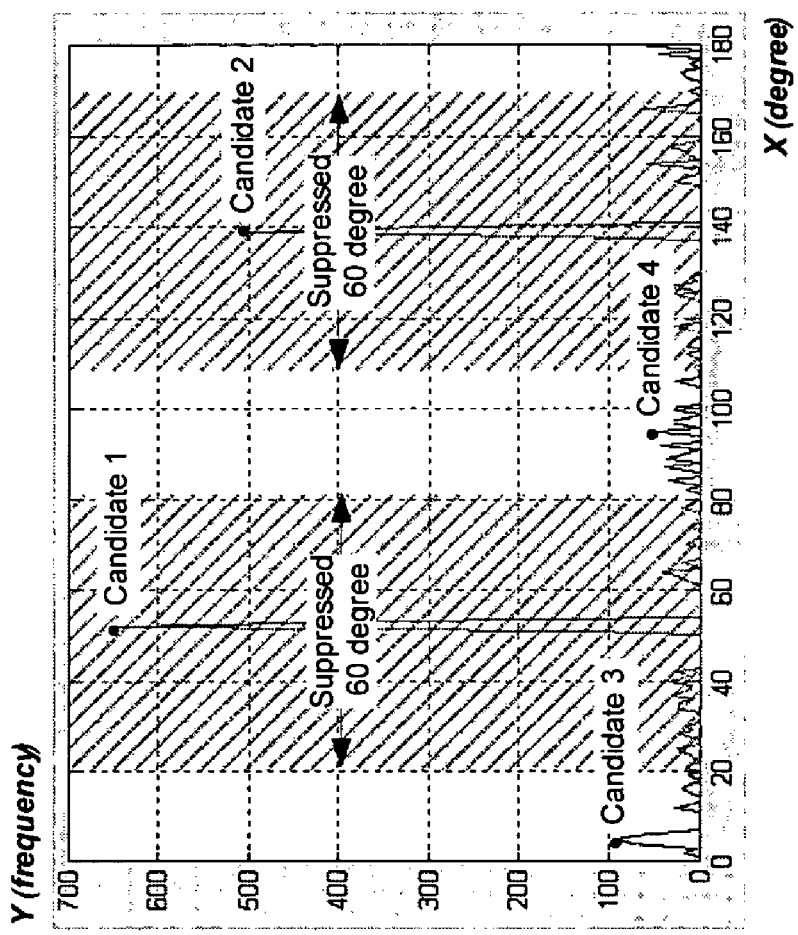
FIG. 14 shows selection of four candidate directions in accordance with aspects of the present invention.

Next, as shown in FIG. 14, four candidates of the main directions are identified. The X value that has the highest Y value is set as Candidate 1. Y values of adjacent X are suppressed to 0, i.e. Y(x)=0, where x is in the range of mod (Candidate 1 ±30, 180). Find the next X value with the highest Y value and set as Candidate 2. Y values of adjacent X are suppressed to 0, i.e. Y(x)=0, where x is in the range of mod (Candidate 2 ±30, 180). Repeat the process to find Candidate 3 and Candidate 4. The reason for the suppression of the regions is that these angles are where EIC symbols are not expected to lie.

From the four candidates, 2 pairs of near perpendicular directions are identified. That is, for a candidate $x_i$, select another candidate $x_j$, such that abs(90-abs($x_i$-$x_j$)) is minimized. abs(x) is a function that returns the absolute value of x. For example, abs(1.8)=1.8, abs(−1.8)=1.8.

Now, select ($x_i$,$x_j$) such that Y($x_i$)+Y($x_j$) is maximized.

Given the pair selected, ($x_i$,$x_j$), centroid of a small area near $x_i$ and $x_j$ is calculated:

$$\bar{x}_i = \frac{\sum_{k=-5}^{5}(\text{mod}(x_i+k,180)\cdot Y(\text{mod}(x_i+k,180)))}{\sum_{k=-5}^{5}(\text{mod}(x_i+k,180))}$$

$$\bar{x}_j = \frac{\sum_{k=-5}^{5}(\text{mod}(x_j+k,180)\cdot Y(\text{mod}(x_j+k,180)))}{\sum_{k=-5}^{5}(\text{mod}(x_j+k,180))}.$$

The two centroids are the two main directions. That is, suppose $\bar{x}_i<\bar{x}_j$, $\theta_h=\bar{x}_i$, and $\theta_v=\bar{x}_j$.

Figure 15:
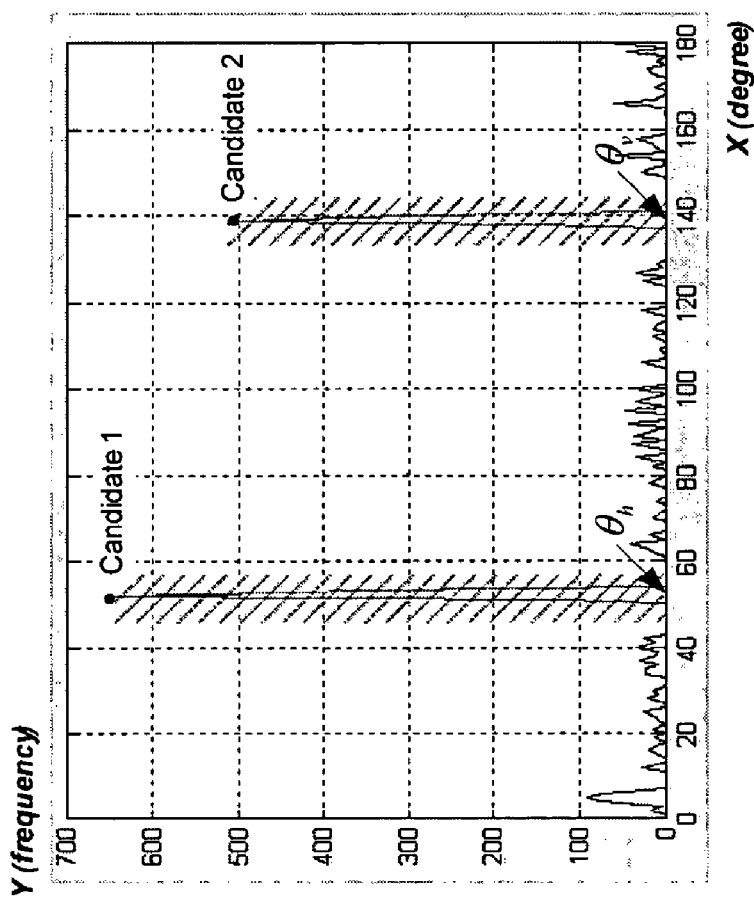
FIG. 15 shows the selection of two main directions in accordance with aspects of the present invention.

FIG. 15 shows the final output of this step, the two main directions $\theta_h$ and $\theta_v$.

Next, the system determines the scale and translation for the EIC symbols.

In the step, one looks for the scale and translation of the affine transform. Scale is the distance between two adjacent parallel lines. Translation is the distance between the image center and the origin of the coordinate system formed by the grid lines. Both scale and translation are measured in pixels.

Figure 16:
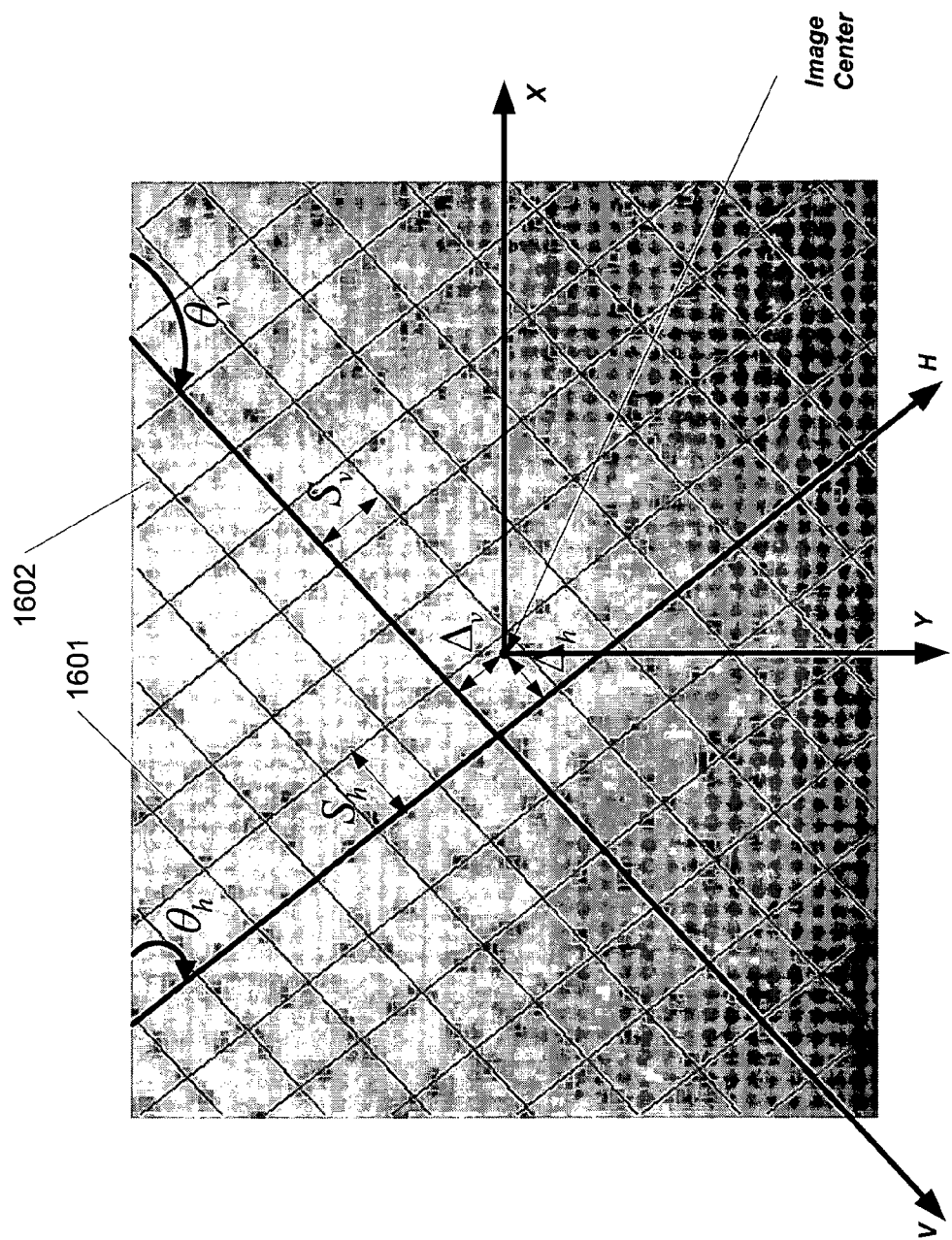
FIG. 16 shows two coordinate systems in accordance with aspects of the present invention.

FIG. 16 shows the affine transformed grid lines. The two main directions are: $\theta_h$, $\theta_v$. The two scales along the two directions are: $S_h$, $S_v$. The two translations are: $\Delta_h$, $\Delta_v$.

Note that the H, V coordinate system shown in FIG. 16 is the coordinate system of the grid. Grid lines are not seen in image. But as explained before, if one assumes an affine transform from paper plane to image plane, EIC pattern in image may appear to lie on grid lines that are an affine transform of the grid lines in EIC symbol array. Therefore, one can draw grid lines in image (the gridlines parallel to lines 1601 and 1602) and the H, V coordinate system based on an affine transform of the grid lines in EIC symbol array.

The X, Y coordinate system shown in FIG. 16 is the coordinate system of the image. Facing the image, X is always left to right and Y is always top to bottom. The image center is the origin of the X, Y coordinate system.

To obtain the two scales $S_h$, $S_v$, the image may be rotated counterclockwise with $\theta_h$, $\theta_v$ respectively.

Figure 17:
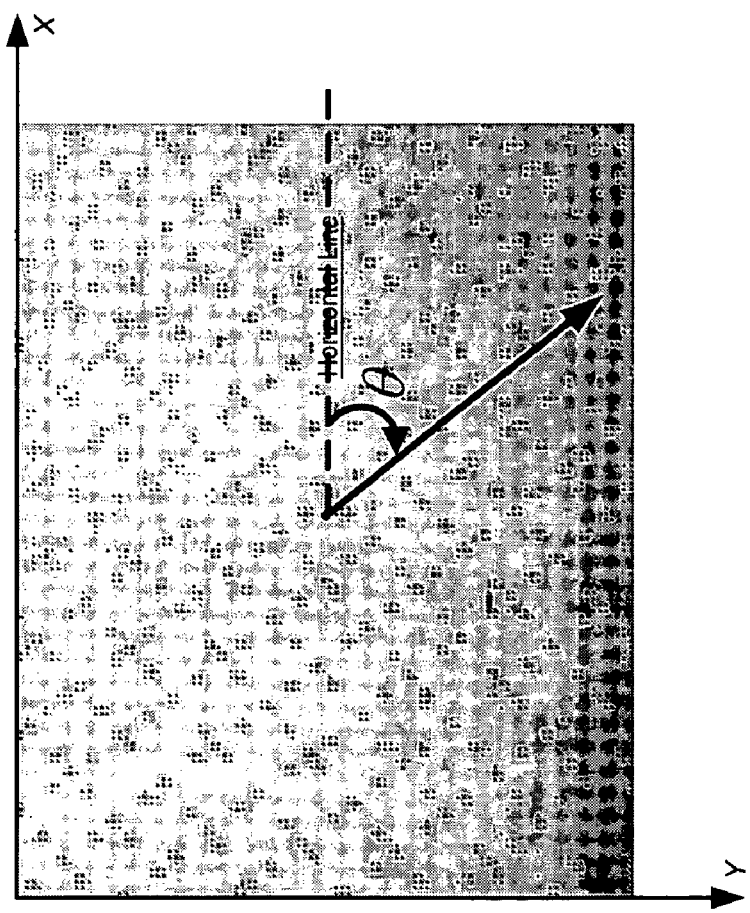
FIG. 17 shows effective embedded interaction coding pixels in accordance with aspects of the present invention.
Figure 18:
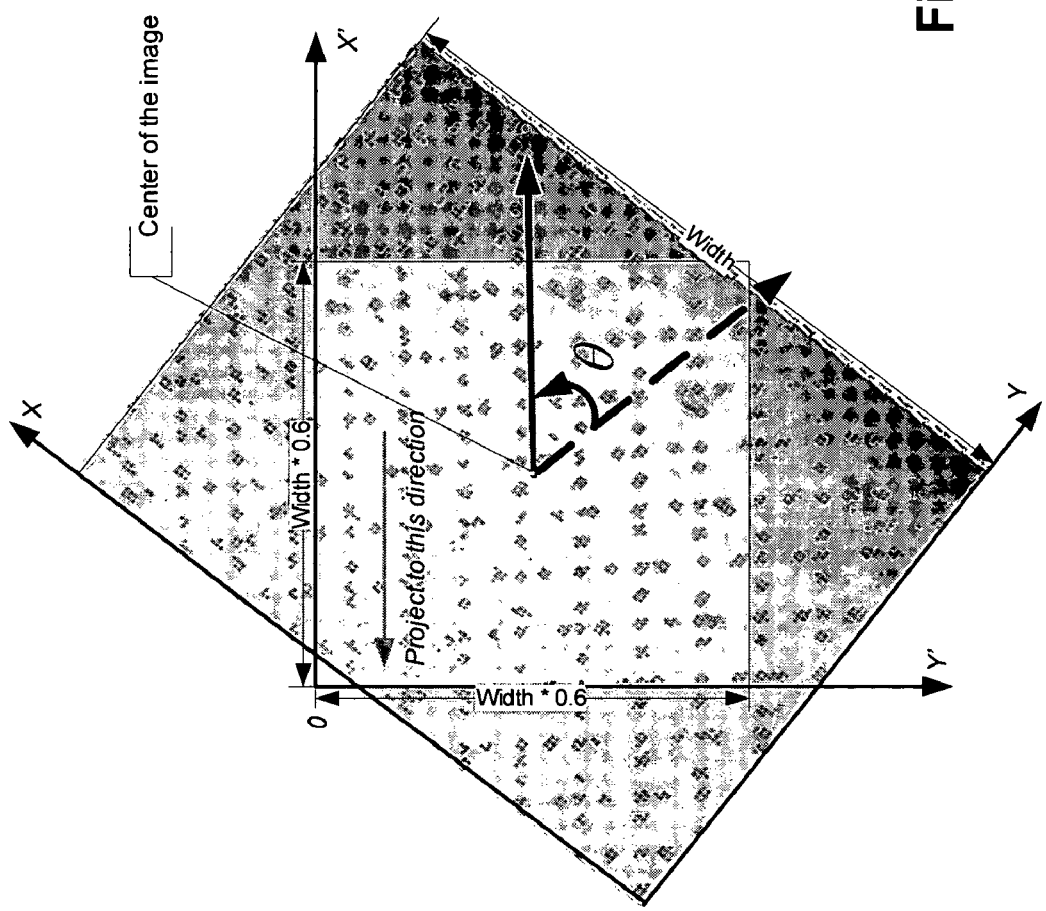
FIG. 18 shows rotated effective embedded interaction coding pixels in accordance with aspects of the present invention.

FIG. 17 shows the image before rotation. FIG. 18 shows the image after being rotated counterclockwise with $\theta$.

In the middle region of the rotated image (shown as the shadowed area in FIG. 18), a coordinate system X', Y' is defined. In one implementation, the height and width of the middle region is 60% of the width of the image sensor. Therefore, distance from the origin of X', Y' to the image center is 30% of the width of the image sensor in both directions.

Figure 19:
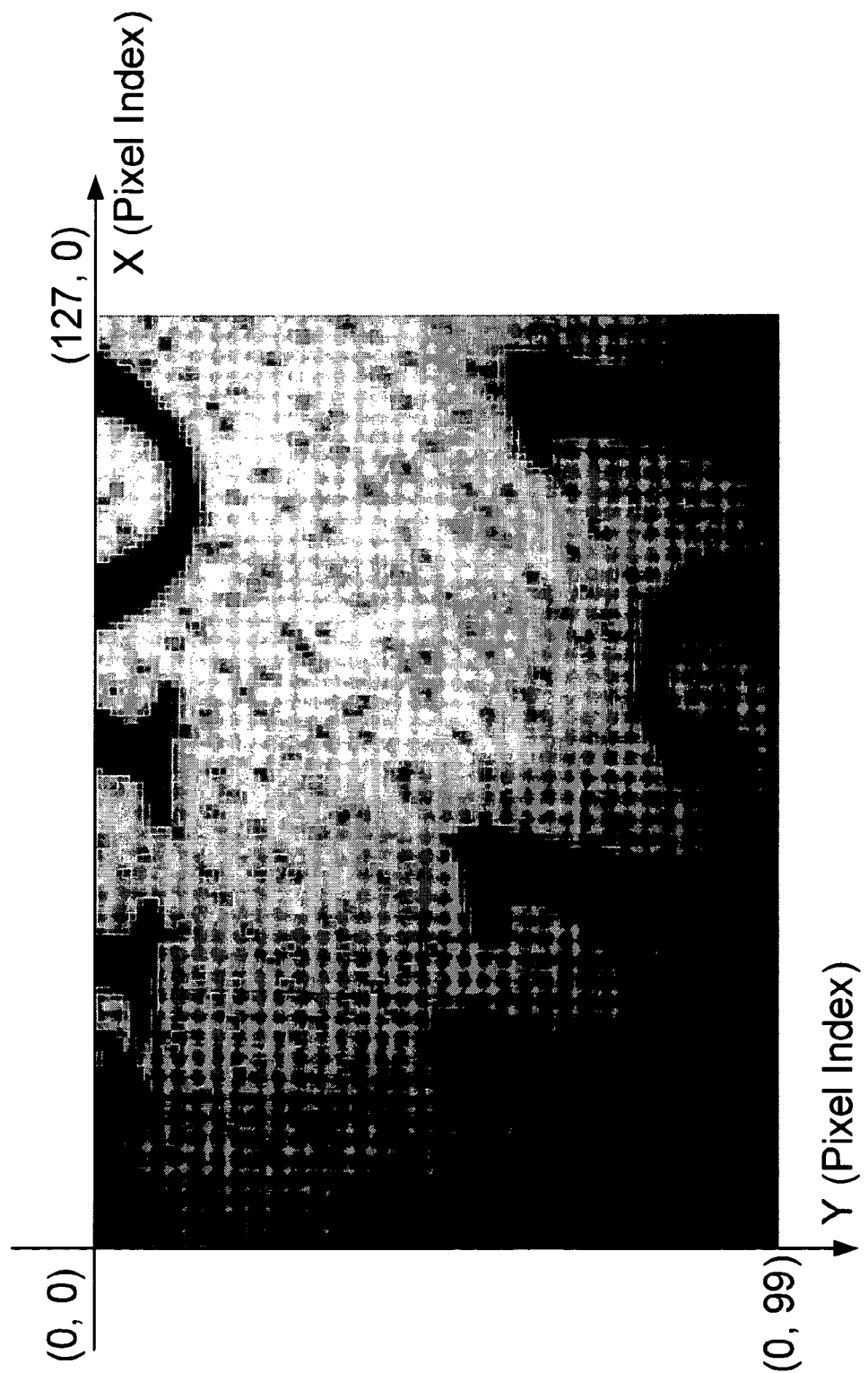
FIG. 19 shows a pixel index applied to an image from a camera in accordance with aspects of the present invention.

For every pixel (x,y), where x=0, 1, . . . , 127, y=0,1, . . . , 99, coordinates of the pixel in the new coordinate system X', Y' are:

$x'=\text{int}\,((x-x_c)\cdot\cos\theta+(y-y_c)\cdot\sin\theta+\text{width}\cdot 0.3)$, $y'=\text{int}\,(-(x-x_c)\cdot\sin\theta+(y-y_c)\cdot\cos\theta+\text{width}\cdot 0.3)$, where ($x_c$,$y_c$) are coordinates of the image center in the pixel index coordinate system depicted in FIG. 19. width is the width of the image sensor. Note that $$x_C = \frac{\text{width}-1}{2},$$

$$y_C = \frac{\text{height}-1}{2},$$

where width is the width of the image sensor, height is the height of the image sensor. This is because in the pixel index coordinate system depicted in FIG. 19, a pixel can be actually indexed by the coordinates of its center.

In one implementation, width=128 height=100, $x_c$=63.5 $y_c$=49.5. Of course, other values may be used as well.

Let Rotate Mask (x',y')=EIC Pattern Mask (x,y)

Figure 20:
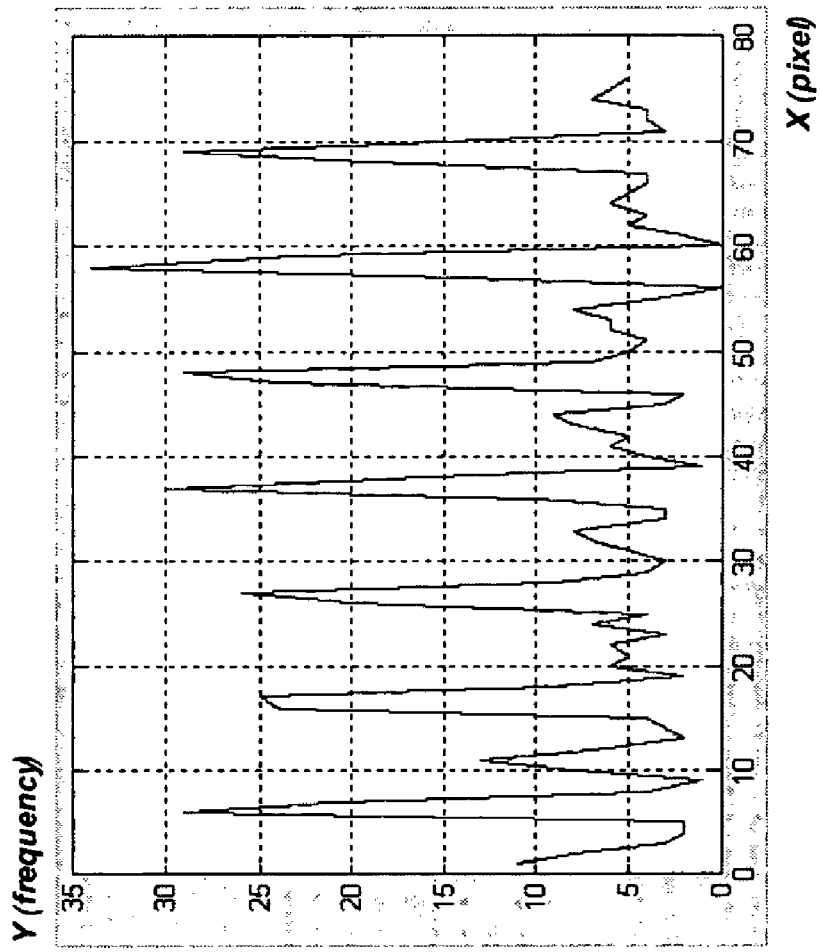
FIG. 20 shows effective EIC pattern pixel projection histogram in accordance with aspects of the present invention.

Now, effective EIC pattern in the middle region are projected to the Y' axis to create a histogram. See FIG. 20. The X axis of the histogram is the value of y'. Since the size of the middle region is width·0.6=76.8, y' is in the range of [0, 75]. The Y axis of the histogram is the count of all x', where x'=0, 1, 2, . . . , 75, and Rotate Mask (x',y')=1.

Next, one attempts to obtain scale and translation information from the histogram.

First, one finds all the Y values that are local maximums. That is, find all the Y values that satisfy Y(x)>Y(x−1) and Y(x)>Y(x+1), where x=1, 2, . . . , 74. The Y values are kept and other Y values are set to 0. Next, the process then sets Y(0)=0 and Y(75)=0. If two local maximums are too close, for example, if both Y($x_1$) and Y($x_2$) are local maximums, and abs($x_1$−$x_2$)<5, then the system keeps the larger Y value, i.e. if Y($x_1$)>Y($x_2$), then the system keeps the value of Y($x_2$) and set Y($x_2$)=0.

Figure 21:
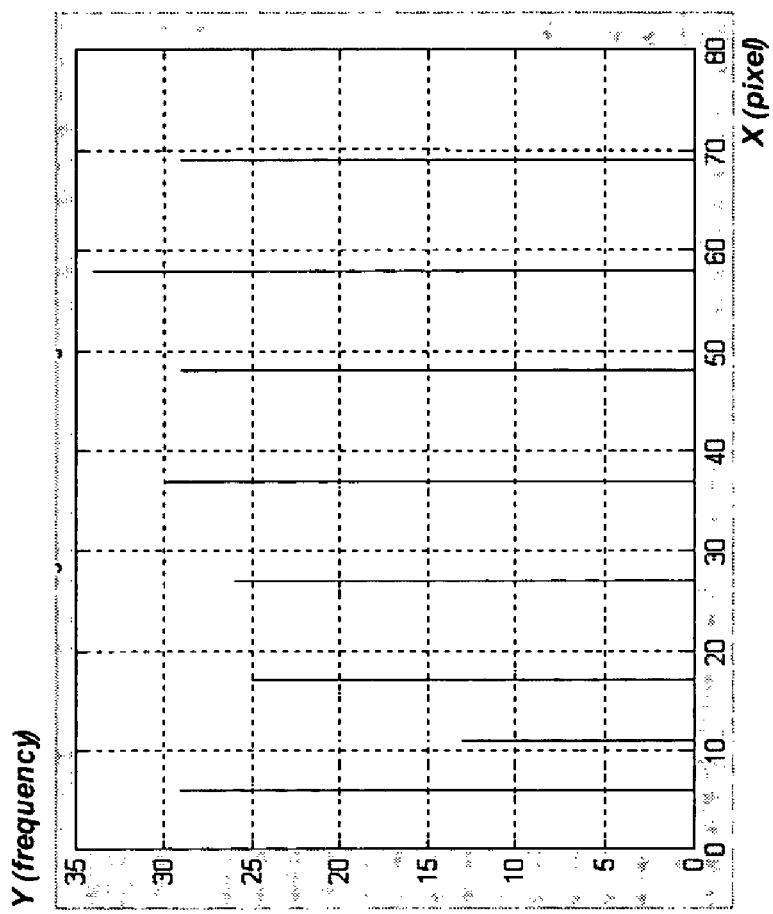
FIG. 21 shows local maximums of the histogram from FIG. 20 in accordance with aspects of the present invention.

Next, the system finds the global maximum ($x_{max}$,$y_{max}$) in the histogram. If $y_{max}$=0, EIC pattern analysis fails for this image. If $y_{max}\neq 0$, the local maximums are compared with the global maximum. If the local maximum is less than ⅓ of the global maximum, the local maximum is set to 0. FIG. 21 shows the resulting histogram.

Suppose the system has found a total of n local maximums, and $x_i$, where i=0, 1, . . . , n−1, are the X values of the local maximums. Let $d_i$, where i=0, 1, . . . , n−2, be the distance between $x_i$ and $x_{i+1}$, i.e. $d_i=x_{i+1}-x_i$. The system obtains the first estimate of scale S by averaging all the distances, i.e.

$$S = \frac{\sum_{i=0}^{n-2} d_i}{n-1}.$$

Next, the system finds the distance $d_j$, where $d_i\neq 0$, i=0, 1, . . . , n−2, that differs from S the most, i.e.

$$j = \underset{i=0}{\overset{n-2}{\text{ArgMax}}}(\text{abs}(d_i-S))\bigg|\, d_i \neq 0.$$

If $d_j$ is not that different from S, i.e. if $$\text{abs}(d_j - S) \le \frac{1}{3}S,$$

then S is the best scale. If $d_j$ is too much bigger than S, for example, if $$(d_j - S) > \frac{1}{3}S,$$

then $d_j$ may be multiples of the actual scale and will affect calculating the average of the distances. Therefore the system sets $d_j$=0. If $d_j$ is too much smaller than S, for example, if $$(S - d_j) > \frac{1}{3}S,$$

the system combines $d_j$ with the next distance $d_{+1}$, if $d_{j+1}>0$; if $d_{j+1}=0$, the system sets $d_j=0$. The system calculates S again by averaging the non-zero $d_i$, s, and goes back to the beginning (where distance $d_i$ is found). The output is a best scale S.

With the best scale S obtained, the system finds the X value, which is an integer multiples of S away from $x_{max}$, i.e. $x_{start}=\text{mod}(x_{max},S)$. Translation $\Delta$ is: $\Delta=S-\text{mod}((x_{center}-x_{start}),S)$. Here, since the size of the middle region is width·0.6=76.8, $$x_{center} = \frac{\text{width} \cdot 0.6}{2} = 38.4.$$

Figure 22:
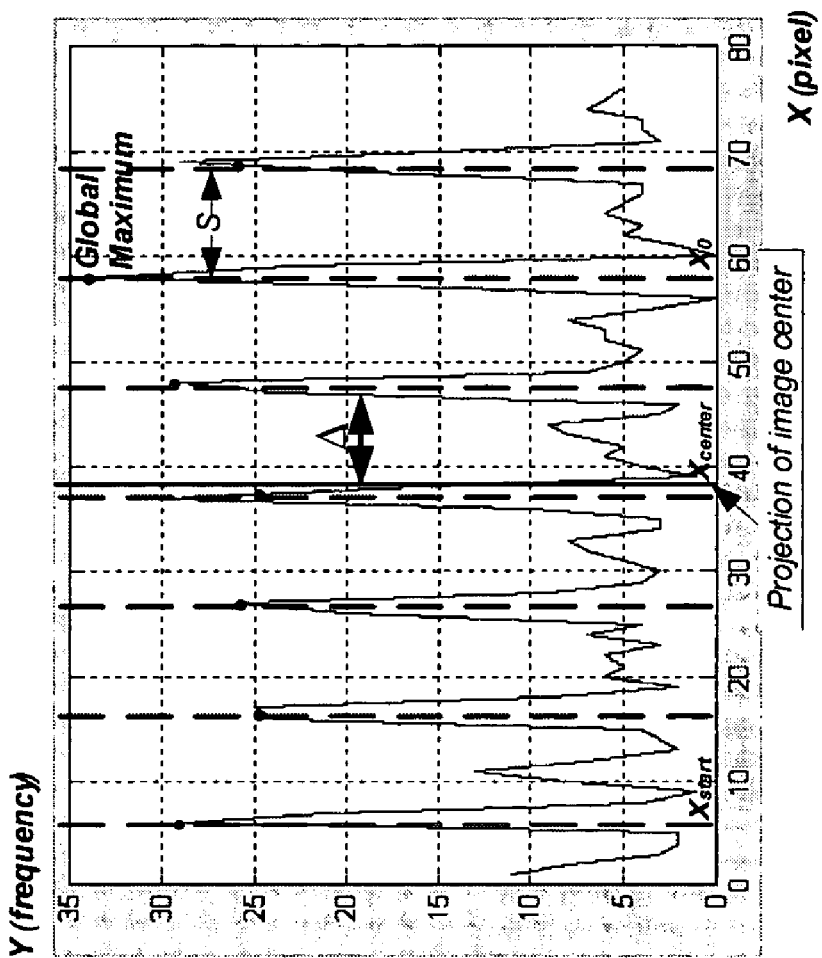
FIG. 22 shows scale and translation in accordance with aspects of the present invention.

FIG. 22 shows the scale and translation obtained. Note that the scale and translation are shown in the original histogram. With the above process, scale and translation for each direction is obtained.

Next, the system obtains an initial homography matrix. This step obtains a homography matrix, H, that describes the affine transform. The homography matrix transforms a point in the coordinate system of the grid, i.e. the H, V coordinate system, to a point in the coordinate system of the image, i.e. the X, Y coordinate system (see FIG. 16). That is, $$\begin{bmatrix} x \\ y \\ 1 \end{bmatrix} = H \cdot \begin{bmatrix} h \\ v \\ 1 \end{bmatrix},$$

and $$\begin{bmatrix} h \\ v \\ 1 \end{bmatrix} = H^{-1} \cdot \begin{bmatrix} x \\ y \\ 1 \end{bmatrix}.$$

Given the rotation, scale and translation obtained, the homography matrix describing the affine transform is:

$$H = \begin{bmatrix} \frac{s_v \cos\theta_h}{\sin(\theta_v - \theta_h)} & \frac{s_h \cos\theta_v}{\sin(\theta_v - \theta_h)} & \frac{\Delta_h \cos\theta_v - \Delta_v \cos\theta_h}{\sin(\theta_v - \theta_h)} \\ \frac{s_v \sin\theta_h}{\sin(\theta_v - \theta_h)} & \frac{s_h \sin\theta_v}{\sin(\theta_v - \theta_h)} & \frac{\Delta_h \sin\theta_v - \Delta_v \sin\theta_h}{\sin(\theta_v - \theta_h)} \\ 0 & 0 & 1 \end{bmatrix}.$$

In the next step, the system uses H as an initial value to obtain a homography matrix that describes a perspective transform from grid to image. That is, grid lines drawn in image may not be evenly spaced or parallel anymore. Instead, they may appear to converge to a vanishing point.

Symbol Segmentation

The next step refines the initial homography matrix by fitting effective EIC pattern to the affine transformed grid lines. The output is a homography matrix H that transforms lines from H, V to X, Y.

First, one can find the relationship between the homograph matrix H that transforms lines from H, V to X, Y and the one H that transforms points from H, V to X, Y.

Figure 23:
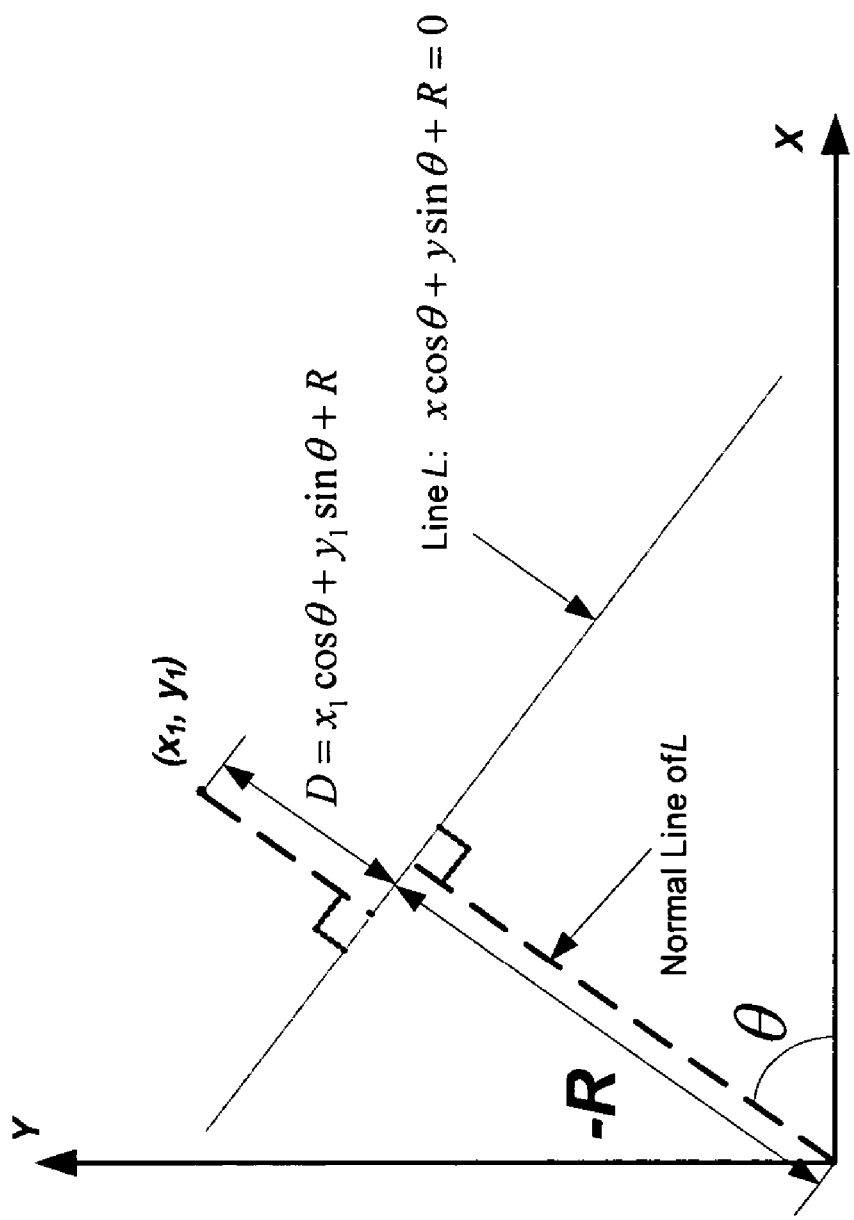
FIG. 23 shows geometrical calculations in accordance with aspects of the present invention.

In X, Y coordinate system, a line L can be represented as:

$x \cos\theta + y \sin\theta + R = 0$, where $\theta$ is the angle between the normal line of L and the X axis, $-R$ is the distance from the origin to line L. See FIG. 23.

Given this representation, the distance from any point $(x_1, y_1)$ to line L is: $D = x_1 \cos\theta + y_1 \sin\theta + R$.

In other words, a line can be represented as:

$$\begin{bmatrix} c & s & R \end{bmatrix} \cdot \begin{bmatrix} x \\ y \\ 1 \end{bmatrix} = 0.$$

When $c^2+s^2=1$, distance of any point $(x_1,y_1)$ to the line is:

$$\begin{bmatrix} c & s & R \end{bmatrix} \cdot \begin{bmatrix} x_1 \\ y_1 \\ 1 \end{bmatrix}.$$

The system uses these representations to represent grid lines in image. Suppose a grid line in the H, V coordinate system is $$\begin{bmatrix} c_{hv} & s_{hv} & R_{hv} \end{bmatrix} \cdot \begin{bmatrix} h \\ v \\ 1 \end{bmatrix} = 0.$$

In X, Y coordinate system, the same line is $$\begin{bmatrix} c_{xy} & s_{xy} & R_{xy} \end{bmatrix} \cdot \begin{bmatrix} x \\ y \\ 1 \end{bmatrix} = 0.$$

Since $$\begin{bmatrix} h \\ v \\ 1 \end{bmatrix} = H^{-1} \cdot \begin{bmatrix} x \\ y \\ 1 \end{bmatrix},$$

this leaves, $$[\, c_{hv} \quad s_{hv} \quad R_{hv} \,] \cdot H^{-1} \cdot \begin{bmatrix} x \\ y \\ 1 \end{bmatrix} = 0 = [\, c_{xy} \quad s_{xy} \quad R_{xy} \,] \cdot \begin{bmatrix} x \\ y \\ 1 \end{bmatrix}.$$

Therefore, $$[\, c_{hv} \quad s_{hv} \quad R_{hv} \,] \cdot H^{-1} = [\, c_{xy} \quad s_{xy} \quad R_{xy} \,],$$

i.e.

$$\begin{bmatrix} c_{xy} \\ s_{xy} \\ R_{xy} \end{bmatrix} = (H^{-1})^t \cdot \begin{bmatrix} c_{hv} \\ s_{hv} \\ R_{hv} \end{bmatrix}.$$

Hence $(H^{-1})^t$ transforms a line from H, V to X, Y and therefore $H=(H^{-1})^t$.

The homography matrix obtained from EIC pattern feature extraction gives an initial value of H, i.e.

$$H_0 = (H^{-1})^t$$

$$= \left( \begin{bmatrix} \frac{s_v \cos\theta_h}{\sin(\theta_v - \theta_h)} & \frac{s_h \cos\theta_v}{\sin(\theta_v - \theta_h)} & \frac{(\Delta_h \cos\theta_v - \Delta_v \cos\theta_h)}{\sin(\theta_v - \theta_h)} \\ \frac{s_v \sin\theta_h}{\sin(\theta_v - \theta_h)} & \frac{s_h \sin\theta_v}{\sin(\theta_v - \theta_h)} & \frac{\Delta_h \sin\theta_v - \Delta_v \sin\theta_h}{\sin(\theta_v - \theta_h)} \\ 0 & 0 & 1 \end{bmatrix}^{-1} \right)^t.$$

The system may refine H by the least squares regression. In H, V coordinate system, the grid lines can be represented as:

$$h \cdot 0 + v \cdot 1 + k_i^h = 0$$

$$h \cdot 1 + v \cdot 0 + k_i^v = 0$$

where $k_i^h$ and $k_i^v$ are indexes of the grid lines along the H and V directions respectively (one can refer to these as H and V lines, respectively), and are positive or negative integers.

Suppose $$H = \begin{bmatrix} h_{11} & h_{12} & h_{13} \\ h_{21} & h_{22} & h_{23} \\ h_{31} & h_{32} & h_{33} \end{bmatrix}.$$

Then in X, Y coordinate system, the H and V lines are:

$$c_i^h \cdot x + s_i^h \cdot y + R_i^h = 0,$$

$$c_i^v \cdot x + s_i^v \cdot y + R_i^v = 0,$$

where $$\begin{pmatrix} c_i^h \\ s_i^h \\ R_i^h \end{pmatrix} = \lambda_i^h \begin{pmatrix} h_{11} & h_{12} & h_{13} \\ h_{21} & h_{22} & h_{23} \\ h_{31} & h_{32} & h_{33} \end{pmatrix} \cdot \begin{pmatrix} 0 \\ 1 \\ k_i^h \end{pmatrix}$$

$$= \frac{1}{\sqrt{(h_{12} + h_{13}k_i^h)^2 + (h_{22} + h_{23}k_i^h)^2}} \begin{pmatrix} h_{12} + h_{13}k_i^h \\ h_{22} + h_{23}k_i^h \\ h_{32} + h_{33}k_i^h \end{pmatrix}$$

$$\begin{pmatrix} c_i^v \\ s_i^v \\ R_i^v \end{pmatrix} = \lambda_i^v \begin{pmatrix} h_{11} & h_{12} & h_{13} \\ h_{21} & h_{22} & h_{23} \\ h_{31} & h_{32} & h_{33} \end{pmatrix} \cdot \begin{pmatrix} 1 \\ 0 \\ k_i^v \end{pmatrix}$$

$$= \frac{1}{\sqrt{(h_{11} + h_{13}k_i^v)^2 + (h_{21} + h_{23}k_i^v)^2}} \begin{pmatrix} h_{11} + h_{13}k_i^v \\ h_{21} + h_{23}k_i^v \\ h_{31} + h_{33}k_i^v \end{pmatrix}$$

where $$\lambda_i^h = \frac{1}{\sqrt{(h_{12} + h_{13}k_i^h)^2 + (h_{22} + h_{23}k_i^h)^2}}$$

and $$\lambda_i^v = \frac{1}{\sqrt{(h_{11} + h_{13}k_i^v)^2 + (h_{21} + h_{23}k_i^v)^2}}$$

are scalars that make $(c_i^h)^2+(s_i^h)^2=1$ and $(c_i^v)^2+(s_i^v)^2=1$.

Now, given the grid lines represented in the X, Y coordinate system, the system looks for all effective EIC pattern pixels close enough to each line. These effective EIC pattern pixels can be used to refine the lines.

Figure 24:
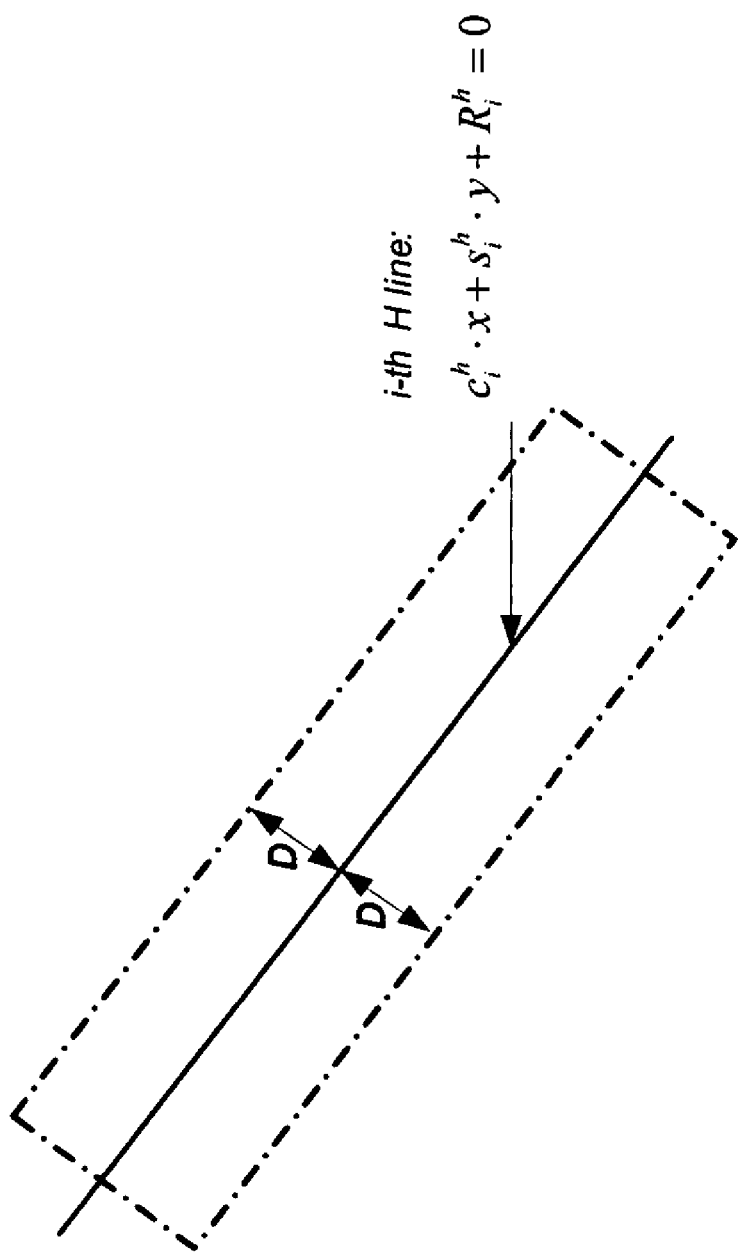
FIG. 24 shows a technique for finding all effective EIC pattern pixels associated with a line in accordance with aspects of the present invention.

If an effective EIC pattern pixel is within a distance of D to a line, it is considered associated with the line. See FIG. 24. In one implementation, D=1.5 pixels.

That is, for every pixel (x,y), where x=0, 1, 2, . . . , 127, y=0, 1, 2, . . . , 99, If EIC Pattern Mask (x,y)=1 abs$((c_i^h \cdot (x-x_c)+s_i^h \cdot (y-y_c)+R_i^h)$<D, then, (x,y) is considered associated with the i-th H line. If EIC Pattern Mask (x,y)=1 abs$((c_i^v \cdot (x-x_c)+s_i^v \cdot (y-y_c)+R_i^v)$<D, then, (x,y) is considered associated with the i-th V line.

Again, $(x_c, y_c)$ are coordinates of the image center in the pixel index coordinate system, and $x_c$=63.5 $y_c$=49.5.

Figure 25:
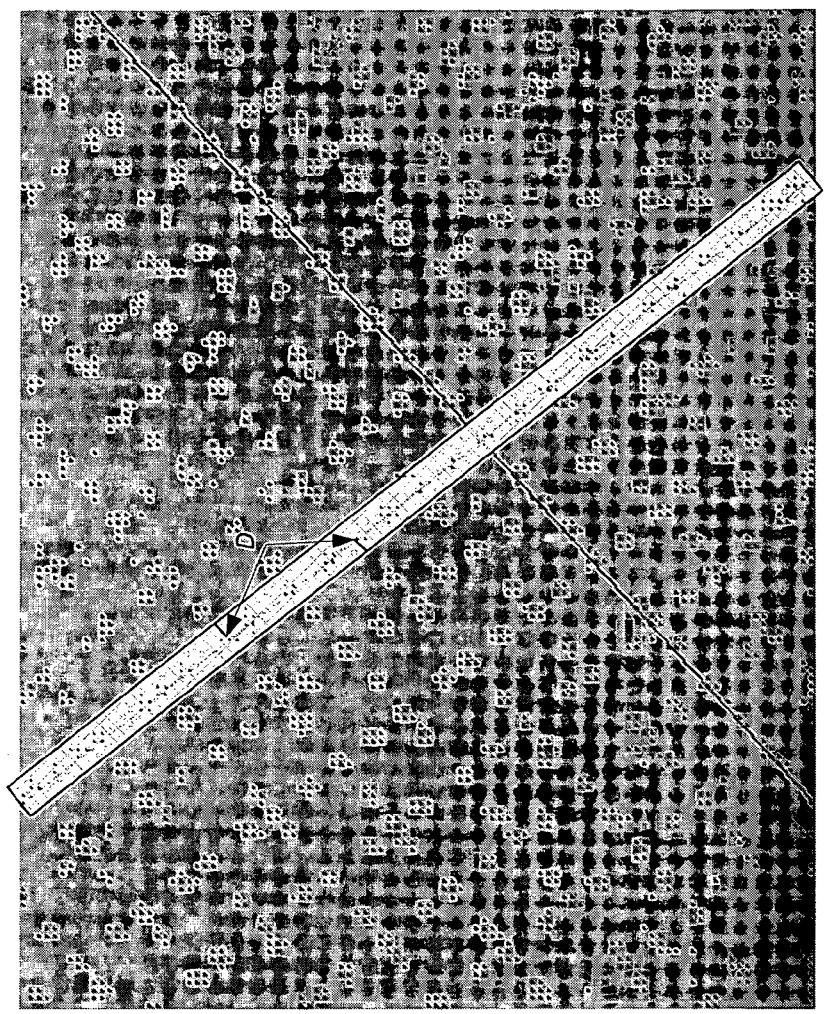
FIG. 25 shows effective EIC pattern pixels associated with a line in accordance with aspects of the present invention.

FIG. 25 shows the effective EIC pattern pixels identified as associated with the line running from top left to bottom right.

Suppose one has identified that effective EIC pattern pixels $(x_{ij}^h, y_{ij}^h)$ are associated with the i-th H line, where i=1, 2, . . . , $m^h$, j=1, 2, . . . , $m_i^h$, $m^h$ is the total number of H lines in the image and $m_i^h$ is the total number of effective EIC pattern pixels associated with the i-th H line. Effective EIC pattern pixels $(x_{ij}^v, y_{ij}^v)$ are associated with the i-th V line, where i=1, 2, . . . , $m^v$, j=1, 2, . . . , $m_i^v$, $m^v$ is the total number of V lines in the image and $m_i^v$ is the total number of effective EIC pattern pixels associated with the i-th V line.

Next, one wants to find the optimal homography matrix H, such that it minimizes the distance between the effective EIC pattern pixels and their associated lines, i.e. one wants to minimize $$g(H) = \frac{1}{2N} \sum_{i=1}^{m^h} \sum_{j=1}^{m_i^h} \gamma_{ij}^h (x_{ij}^h c_i^h + y_{ij}^h s_i^h + R_i^h)^2 +$$

$$\frac{1}{2N} \sum_{i=1}^{m^v} \sum_{j=1}^{m_i^v} \gamma_{ij}^v (x_{ij}^v c_i^v + y_{ij}^v s_i^v + R_i^v)^2,$$

where $$N = \sum_{i=1}^{m^h} m_i^h + \sum_{i=1}^{m^v} m_i^v,$$

i.e. N is the total number of effective EIC pattern pixels associated with all the lines, $\gamma_{ij}^h$ and $\gamma_{ij}^v$ are weights. In one implementation, $\gamma_{ij}^h = 1$ and $\gamma_{ij}^v = 1$.

Define:

$$g_{ij}^h(H) = \frac{x_{ij}^h(h_{12} + h_{13}k_i^h) + y_{ij}^h(h_{22} + h_{23}k_i^h) + (h_{32} + h_{33}k_i^h)}{\sqrt{(h_{12} + h_{13}k_i^h)^2 + (h_{22} + h_{23}k_i^h)^2}}, \text{ and}$$

$$g_{ij}^v(H) = \frac{x_{ij}^v(h_{11} + h_{13}k_i^v) + y_{ij}^v(h_{21} + h_{23}k_i^v) + (h_{31} + h_{33}k_i^v)}{\sqrt{(h_{11} + h_{13}k_i^v)^2 + (h_{21} + h_{23}k_i^v)^2}},$$

one may re-write g(H) as:

$$g(H) = \frac{1}{2N} \sum_{i=1}^{m^{h'}} \sum_{j=1}^{m_i^h} \gamma_{ij}^h [g_{ij}^h(H)]^2 + \frac{1}{2N} \sum_{i=1}^{m^v} \sum_{j=1}^{m_i^v} \gamma_{ij}^v [g_{ij}^v(H)]^2.$$

After H is initialized, to get more accurate estimates of H, suppose one wants to update the current H by δH then the increment δH should minimize g(H+δH).

Since $$g_{ij}^h(H+\delta H) \approx g_{ij}^h(H) + (\nabla g_{ij}^h)^t \delta H, \; g_{ij}^v(H+\delta H) \approx g_{ij}^v(H) + (\nabla g_{ij}^v)^t \delta H,$$

one has, $$g(H+\delta H) \approx \frac{1}{2N} \sum_{i=1}^{m^h} \sum_{j=1}^{m_i^h} \gamma_{ij}^h [g_{ij}^h(H) + (\nabla g_{ij}^h)^t \delta H]^2 +$$

$$\frac{1}{2N} \sum_{i=1}^{m^v} \sum_{j=1}^{m_i^v} \gamma_{ij}^v [g_{ij}^v(H) + (\nabla g_{ij}^v)^t \delta H]^2 =$$

$$\frac{1}{2N} \left\{ \sum_{i=1}^{m^h} \sum_{j=1}^{m_i^h} \gamma_{ij}^h [g_{ij}^h(H)]^2 + \sum_{i=1}^{m^v} \sum_{j=1}^{m_i^v} \gamma_{ij}^v [g_{ij}^v(H)]^2 \right\} +$$

-continued $$\frac{1}{N} \left[ \sum_{i=1}^{m^h} \sum_{j=1}^{m_i^h} \gamma_{ij}^h g_{ij}^h(H)(\nabla g_{ij}^h)^t + \sum_{i=1}^{m^v} \sum_{j=1}^{m_i^v} \gamma_{ij}^v g_{ij}^v(H)(\nabla g_{ij}^v)^t \right] \delta H +$$

$$\frac{1}{2N}(\delta H)^t \left[ \sum_{i=1}^{m^h} \sum_{j=1}^{m_i^h} \gamma_{ij}^h \nabla g_{ij}^h (\nabla g_{ij}^h)^t + \sum_{i=1}^{m^v} \sum_{j=1}^{m_i^v} \gamma_{ij}^v \nabla g_{ij}^v (\nabla g_{ij}^v)^t \right] \delta H$$

Therefore, $$\frac{\partial [g(H+\delta H)]}{\partial (\delta H)} = \frac{1}{N} \left[ \sum_{i=1}^{m^h} \sum_{j=1}^{m_i^h} \gamma_{ij}^h g_{ij}^h(H) \nabla g_{ij}^h + \sum_{i=1}^{m^v} \sum_{j=1}^{m_i^v} \gamma_{ij}^v g_{ij}^v(H) \nabla g_{ij}^v \right] +$$

$$\frac{1}{N} \left[ \sum_{i=1}^{m^h} \sum_{j=1}^{m_i^h} \gamma_{ij}^h \nabla g_{ij}^h (\nabla g_{ij}^h)^t + \sum_{i=1}^{m^v} \sum_{j=1}^{m_i^v} \gamma_{ij}^v \nabla g_{ij}^v (\nabla g_{ij}^v)^t \right] \delta H$$

By making the above variation 0 in order to minimize g(H+δH), one has:

$$\delta H = - \left[ \sum_{i=1}^{m^h} \sum_{j=1}^{m_i^h} \gamma_{ij}^h \nabla g_{ij}^h (\nabla g_{ij}^h)^t + \sum_{i=1}^{m^v} \sum_{j=1}^{m_i^v} \gamma_{ij}^v \nabla g_{ij}^v (\nabla g_{ij}^v)^t \right]^{-1}$$

$$\left[ \sum_{i=1}^{m^h} \sum_{j=1}^{m_i^h} \gamma_{ij}^h g_{ij}^h(H) \nabla g_{ij}^h + \sum_{i=1}^{m^v} \sum_{j=1}^{m_i^v} \gamma_{ij}^v g_{ij}^v(H) \nabla g_{ij}^v \right] (*)$$

After solving for δH, if g(H+δH)<g(H), one may update H, i.e. H=H+δH. If g(H+δH)≧g(H), the systems stops and the last H is the final H.

Given the new H, one can repeat the process outlined in this section, by updating the points that are associated to the updated grid lines. This process can converge or stop until a number of iterations have been performed. For instance, the process may end at 30 times.

Figure 26:
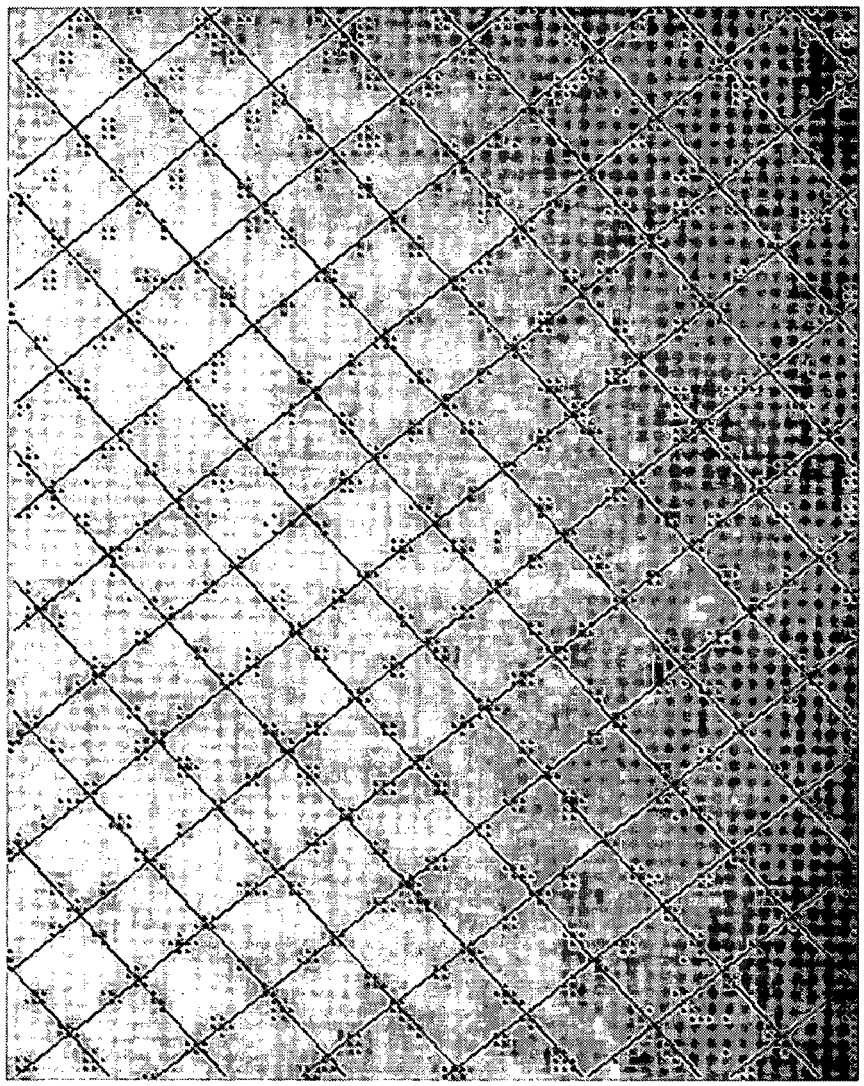
FIG. 26 shows grid lines before regression in accordance with aspects of the present invention.
Figure 27:
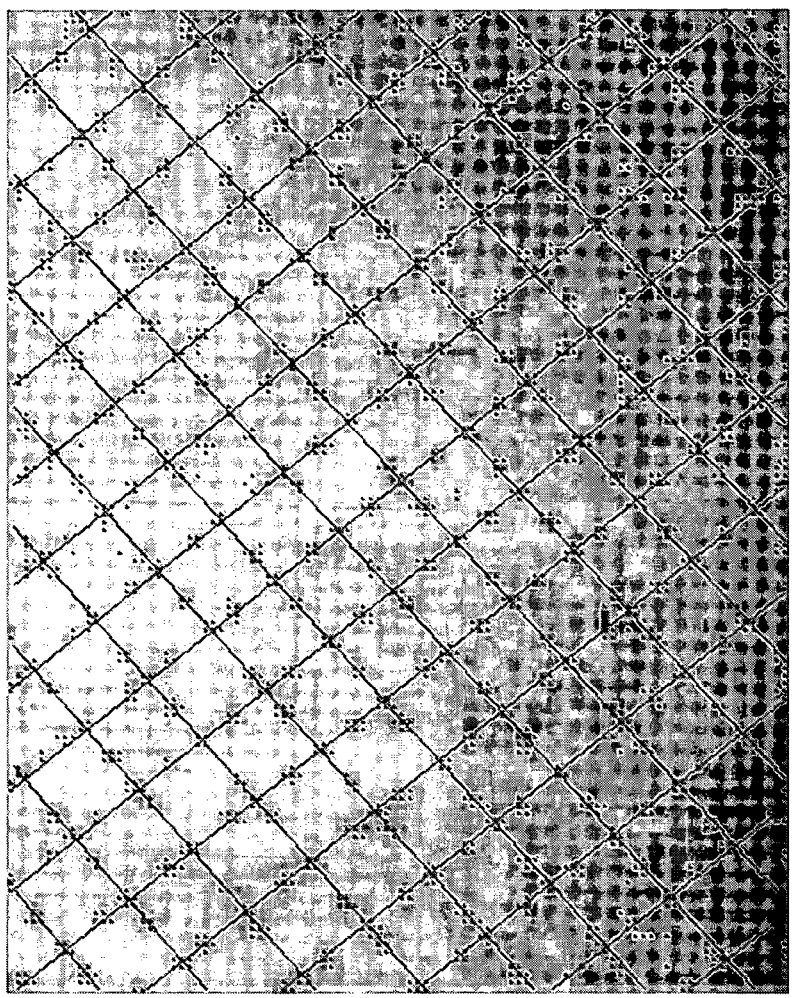
FIG. 27 shows grid lines after regression in accordance with aspects of the present invention.

FIG. 26 shows grid lines obtained before regression, i.e. obtained from an affine transform of the grid lines in EIC symbol array. FIG. 27 shows grid lines obtained after regression, i.e. obtained from a perspective transform of the grid lines in EIC symbol array.

Finally, convert homography matrix for line transform (H) to homography matrix for point transform (H):

$$H = (H^t)^{-1}.$$

This is referred to as the homography matrix $H_{Grid \to Image}$, which is the final output of EIC pattern analysis.

Further Details for Homography Computation

The following provides further details for fast homography computation by reusing the intermediate computation results at the best. Computing summations directly as written above may be used. Alternatively, one can reduce repeated computation by reformulating the summations in the following manner.

Let $$\phi_{p13,i}^v = h_{p1} + h_{p3}k_i^v, \; \phi_{p23,i}^h = h_{p2} + h_{p3}k_i^h, \; p = 1, 2, 3, \quad (1)$$

$$\rho_i^v = [(\phi_{113,i}^v)^2 + (\phi_{213,i}^v)^2]^{-1}, \; \rho_i^h = [(\phi_{123,i}^h)^2 + (\phi_{223,i}^h)^2]^{-1},$$

$$\psi_{xx,i}^v = \sum_{j=1}^{m_i^v} \gamma_{ij}^v (x_{ij}^v)^2, \; \psi_{xy,i}^v = \sum_{j=1}^{m_i^v} \gamma_{ij}^v x_{ij}^v y_{ij}^v, \; \psi_{yy,i}^v = \sum_{j=1}^{m_i^v} \gamma_{ij}^v (y_{ij}^v)^2,$$

$$\psi_{x,i}^v = \sum_{j=1}^{m_i^v} \gamma_{ij}^v x_{ij}^v, \; \psi_{y,i}^v = \sum_{j=1}^{m_i^v} \gamma_{ij}^v y_{ij}^v, \; \psi_{1,i}^v = \sum_{j=1}^{m_i^v} \gamma_{ij}^v,$$

$$\psi_{xx,i}^h = \sum_{j=1}^{m_i^h} \gamma_{ij}^h (x_{ij}^h)^2, \; \psi_{xy,i}^h = \sum_{j=1}^{m_i^h} \gamma_{ij}^h x_{ij}^h y_{ij}^h, \; \psi_{yy,i}^h = \sum_{j=1}^{m_i^h} \gamma_{ij}^h (y_{ij}^h)^2, \quad (2)$$

$$\psi_{x,i}^h = \sum_{j=1}^{m_i^h} \gamma_{ij}^h x_{ij}^h, \; \psi_{y,i}^h = \sum_{j=1}^{m_i^h} \gamma_{ij}^h y_{ij}^h, \; \psi_{1,i}^h = \sum_{j=1}^{m_i^h} \gamma_{ij}^h,$$

$$\Gamma_{1,i}^v = \rho_i^v (\phi_{113,i}^v \psi_{x,i}^v + \phi_{213,i}^v \psi_{y,i}^v + \phi_{313,i}^v \psi_{1,i}^v),$$
$$\Gamma_{x,i}^v = \rho_i^v (\phi_{113,i}^v \psi_{xx,i}^v + \phi_{213,i}^v \psi_{xy,i}^v + \phi_{313,i}^v \psi_{x,i}^v),$$
$$\Gamma_{y,i}^v = \rho_i^v (\phi_{113,i}^v \psi_{xy,i}^v + \phi_{213,i}^v \psi_{yy,i}^v + \phi_{313,i}^v \psi_{y,i}^v),$$
$$\Gamma_{1,i}^h = \rho_i^h (\phi_{123,i}^h \psi_{x,i}^h + \phi_{223,i}^h \psi_{y,i}^h + \phi_{323,i}^h \psi_{1,i}^h),$$
$$\Gamma_{x,i}^h = \rho_i^h (\phi_{123,i}^h \psi_{xx,i}^h + \phi_{223,i}^h \psi_{xy,i}^h + \phi_{323,i}^h \psi_{x,i}^h),$$
$$\Gamma_{y,i}^h = \rho_i^h (\phi_{123,i}^h \psi_{xy,i}^h + \phi_{223,i}^h \psi_{yy,i}^h + \phi_{323,i}^h \psi_{y,i}^h),$$

$$\Omega_i^v = \rho_i^v (\phi_{113,i}^v \Gamma_{x,i}^v + \phi_{213,i}^v \Gamma_{y,i}^v + \phi_{313,i}^v \Gamma_{1,i}^v), \quad (3)$$
$$\Psi_i^v = \phi_{113,i}^v \Omega_i^v, \; \Phi_i^v = \phi_{213,i}^v \Omega_i^v,$$
$$\Omega_i^h = \rho_i^h (\phi_{123,i}^h \Gamma_{x,i}^h + \phi_{223,i}^h \Gamma_{y,i}^h + \phi_{323,i}^h \Gamma_{1,i}^h),$$
$$\Psi_i^v = \phi_{123,i}^h \Omega_i^h, \; \Phi_i^h = \phi_{223,i}^h \Omega_i^h,$$

$$\Delta_{x,i}^v = \Gamma_{x,i}^v - \Psi_i^v, \; \Delta_{y,i}^v = \Gamma_{y,i}^v - \Phi_i^v, \quad (4)$$
$$\Delta_{x,i}^h = \Gamma_{x,i}^h - \Psi_i^h, \; \Delta_{y,i}^h = \Gamma_{y,i}^h - \Phi_i^h,$$

The above variables can be computed and stored so that they can be reused. Some of the variables are computed from previously defined ones. This makes the computation efficient.

Further define:

$$\omega_{ij}^h = x_{ij}^h \phi_{123,i}^h + y_{ij}^h \phi_{223,i}^h + \phi_{323,i}^h, \; \omega_{ij}^v = x_{ij}^v \phi_{113,i}^v + y_{ij}^v \phi_{213,i}^v + \phi_{313,i}^v,$$

then $$g_{ij}^h(H) = \sqrt{\rho_i^h}\,\omega_{ij}^h, \; g_{ij}^v(H) = \sqrt{\rho_i^v}\,\omega_{ij}^v.$$

Here, one may want to express the gradients in (*) with the variables defined in (1)~(4) so that repeated computation can be minimized.

First, the components of $\nabla g_{ij}^h$ and $\nabla g_{ij}^v$ can be represented explicitly:

$$\frac{\partial g_{ij}^h}{\partial h_{11}} = 0, \; \frac{\partial g_{ij}^h}{\partial h_{12}} = \sqrt{\rho_i^h}\,(x_{ij}^h - \rho_i^h \phi_{123,i}^h \omega_{ij}^h),$$

$$\frac{\partial g_{ij}^h}{\partial h_{13}} = k_i^h \sqrt{\rho_i^h}\,(x_{ij}^h - \rho_i^h \phi_{123,i}^h \omega_{ij}^h) = k_i^h \frac{\partial g_{ij}^h}{\partial h_{12}},$$

$$\frac{\partial g_{ij}^h}{\partial h_{21}} = 0, \; \frac{\partial g_{ij}^h}{\partial h_{22}} = \sqrt{\rho_i^h}\,(y_{ij}^h - \rho_i^h \phi_{223,i}^h \omega_{ij}^h),$$

$$\frac{\partial g_{ij}^h}{\partial h_{23}} = k_i^h \sqrt{\rho_i^h}\,(y_{ij}^h - \rho_i^h \phi_{223,i}^h \omega_{ij}^h) = k_i^h \frac{\partial g_{ij}^h}{\partial h_{22}},$$

-continued $$\frac{\partial g_{ij}^h}{\partial h_{31}} = 0, \; \frac{\partial g_{ij}^h}{\partial h_{32}} = \sqrt{\rho_i^h}, \; \frac{\partial g_{ij}^h}{\partial h_{33}} = k_i^h \sqrt{\rho_i^h} = k_i^h \frac{\partial g_{ij}^h}{\partial h_{32}},$$

$$\frac{\partial g_{ij}^v}{\partial h_{11}} = \sqrt{\rho_i^v}\,(x_{ij}^v - \rho_i^v \phi_{113,i}^v \omega_{ij}^v), \; \frac{\partial g_{ij}^v}{\partial h_{12}} = 0,$$

$$\frac{\partial g_{ij}^v}{\partial h_{13}} = k_i^v \sqrt{\rho_i^v}\,(x_{ij}^v - \rho_i^v \phi_{113,i}^v \omega_{ij}^v) = k_i^v \frac{\partial g_{ij}^v}{\partial h_{11}},$$

$$\frac{\partial g_{ij}^v}{\partial h_{21}} = \sqrt{\rho_i^v}\,(y_{ij}^v - \rho_i^v \phi_{213,i}^v \omega_{ij}^v), \; \frac{\partial g_{ij}^v}{\partial h_{22}} = 0,$$

$$\frac{\partial g_{ij}^v}{\partial h_{23}} = k_i^v \sqrt{\rho_i^v}\,(y_{ij}^v - \rho_i^v \phi_{213,i}^v \omega_{ij}^v) = k_i^v \frac{\partial g_{ij}^v}{\partial h_{21}},$$

$$\frac{\partial g_{ij}^v}{\partial h_{31}} = \sqrt{\rho_i^v}, \; \frac{\partial g_{ij}^v}{\partial h_{32}} = 0, \; \frac{\partial g_{ij}^v}{\partial h_{33}} = k_i^v \sqrt{\rho_i^v} = k_i^v \frac{\partial g_{ij}^v}{\partial h_{31}},$$

Therefore, at this point, two observations are made:

a. Those terms related to $$\frac{\partial g_{ij}^h}{\partial h_{p1}}$$

or $$\frac{\partial g_{ij}^v}{\partial h_{p2}},$$

p=1,2,3, need not be computed when computing $$\sum_{j=1}^{m_i^h} \gamma_{ij}^h \nabla g_{ij}^h (\nabla g_{ij}^h)^t \text{ and } \sum_{j=1}^{m_i^v} \gamma_{ij}^v \nabla g_{ij}^v (\nabla g_{ij}^v)^t$$

because they are zeros, and b. When a term related to $$\frac{\partial g_{ij}^h}{\partial h_{p2}}$$

or $$\frac{\partial g_{ij}^v}{\partial h_{p1}},$$

p=1,2,3, is computed, the term related to $$\frac{\partial g_{ij}^h}{\partial h_{p3}}$$

or $$\frac{\partial g_{ij}^v}{\partial h_{p3}},$$

p=1,2,3, need not be recomputed from the beginning because they only differ by $k_i^h$ or $k_i^v$.

Further, one can reduce the computation by additional efforts.

To compute $$\sum_{j=1}^{m_i^h} \gamma_{ij}^h g_{ij}^h(H) \nabla g_{ij}^h \text{ and } \sum_{j=1}^{m_i^v} \gamma_{ij}^v \nabla g_{ij}^v (\nabla g_{ij}^v)^t;$$

$$\sum_{j=1}^{m_i^h} \gamma_{ij}^h g_{ij}^h(H) \frac{\partial g_{ij}^h}{\partial h_{12}} = \Delta_{x,i}^h, \quad \sum_{j=1}^{m_i^h} \gamma_{ij}^h g_{ij}^h(H) \frac{\partial g_{ij}^h}{\partial h_{22}} = \Delta_{y,i}^h,$$

$$\sum_{j=1}^{m_i^h} \gamma_{ij}^h g_{ij}^h(H) \frac{\partial g_{ij}^h}{\partial h_{32}} = \Gamma_{1,i}^h,$$

$$\sum_{j=1}^{m_i^v} \gamma_{ij}^v g_{ij}^v(H) \frac{\partial g_{ij}^v}{\partial h_{11}} = \Delta_{x,i}^v, \quad \sum_{j=1}^{m_i^v} \gamma_{ij}^v g_{ij}^v(H) \frac{\partial g_{ij}^v}{\partial h_{21}} = \Delta_{y,i}^v,$$

$$\sum_{j=1}^{m_i^v} \gamma_{ij}^v g_{ij}^v(H) \frac{\partial g_{ij}^v}{\partial h_{31}} = \Gamma_{1,i}^v,$$

the rest terms, $$\sum_{j=1}^{m_i^h} \gamma_{ij}^h g_{ij}^h(H) \frac{\partial g_{ij}^h}{\partial h_{p1}}$$

and $$\sum_{j=1}^{m_i^v} \gamma_{ij}^v g_{ij}^v(H) \frac{\partial g_{ij}^v}{\partial h_{p2}},$$

p=1,2,3, are not described herein because they are zeros. Moreover, $$\sum_{j=1}^{m_i^h} \gamma_{ij}^h g_{ij}^h(H) \frac{\partial g_{ij}^h}{\partial h_{p3}}$$

and $$\sum_{j=1}^{m_i^v} \gamma_{ij}^v g_{ij}^v(H) \frac{\partial g_{ij}^v}{\partial h_{p3}},$$

p=1,2,3, are not described either because they can be obtained by multiplying $k_i^h$ or $k_i^v$ to $$\sum_{j=1}^{m_i^h} \gamma_{ij}^h g_{ij}^h(H) \frac{\partial g_{ij}^h}{\partial h_{p2}} \text{ or } \sum_{j=1}^{m_i^v} \gamma_{ij}^v g_{ij}^v(H) \frac{\partial g_{ij}^v}{\partial h_{p1}},$$

according to previous observations.

Next, to compute $$\sum_{j=1}^{m_i^h} \gamma_{ij}^h \nabla g_{ij}^h (\nabla g_{ij}^h)^t$$

and $$\sum_{j=1}^{m_i^v} \gamma_{ij}^v \nabla g_{ij}^v (\nabla g_{ij}^v)^t;$$

$$\sum_{j=1}^{m_i^h} \gamma_{ij}^h \frac{\partial g_{ij}^h}{\partial h_{12}} \frac{\partial g_{ij}^h}{\partial h_{12}} = \rho_i^h [\psi_{xx,i}^h - \phi_{123,i}^h (\Gamma_{x,i}^h + \Delta_{x,i}^h)],$$

$$\sum_{j=1}^{m_i^h} \gamma_{ij}^h \frac{\partial g_{ij}^h}{\partial h_{12}} \frac{\partial g_{ij}^h}{\partial h_{22}} = \rho_i^h (\psi_{xy,i}^h - \phi_{223,i}^h \Gamma_{x,i}^h - \phi_{123,i}^h \Delta_{y,i}^h),$$

$$\sum_{j=1}^{m_i^h} \gamma_{ij}^h \frac{\partial g_{ij}^h}{\partial h_{12}} \frac{\partial g_{ij}^h}{\partial h_{32}} = \rho_i^h (\psi_{x,i}^h - \phi_{123,i}^h \Gamma_{1,i}^h),$$

$$\sum_{j=1}^{m_i^h} \gamma_{ij}^h \frac{\partial g_{ij}^h}{\partial h_{22}} \frac{\partial g_{ij}^h}{\partial h_{22}} = \rho_i^h [\psi_{yy,i}^h - \phi_{223,i}^h (\Gamma_{y,i}^h + \Delta_{y,i}^h)],$$

$$\sum_{j=1}^{m_i^h} \gamma_{ij}^h \frac{\partial g_{ij}^h}{\partial h_{22}} \frac{\partial g_{ij}^h}{\partial h_{32}} = \rho_i^h (\psi_{y,i}^h - \phi_{223,i}^h \Gamma_{1,i}^h),$$

$$\sum_{j=1}^{m_i^h} \gamma_{ij}^h \frac{\partial g_{ij}^h}{\partial h_{32}} \frac{\partial g_{ij}^h}{\partial h_{32}} = \rho_i^h \psi_{1,i}^h,$$

$$\sum_{j=1}^{m_i^v} \gamma_{ij}^v \frac{\partial g_{ij}^v}{\partial h_{11}} \frac{\partial g_{ij}^v}{\partial h_{11}} = \rho_i^v [\psi_{xx,i}^v - \phi_{113,i}^v (\Gamma_{x,i}^v + \Delta_{x,i}^v)],$$

-continued $$\sum_{j=1}^{m_i^v} \gamma_{ij}^v \frac{\partial g_{ij}^v}{\partial h_{11}} \frac{\partial g_{ij}^v}{\partial h_{21}} = \rho_i^v(\psi_{xy,i}^v - \phi_{213,i}^v \Gamma_{x,i}^v - \phi_{113,i}^v \Delta_{y,i}^v),$$

$$\sum_{j=1}^{m_i^v} \gamma_{ij}^v \frac{\partial g_{ij}^v}{\partial h_{11}} \frac{\partial g_{ij}^v}{\partial h_{31}} = \rho_i^v(\psi_{x,i}^v - \phi_{113,i}^v \Gamma_{1,i}^v),$$

$$\sum_{j=1}^{m_i^v} \gamma_{ij}^v \frac{\partial g_{ij}^v}{\partial h_{21}} \frac{\partial g_{ij}^v}{\partial h_{21}} = \rho_i^v[\psi_{yy,i}^v - \phi_{213,i}^v(\Gamma_{y,i}^v + \Delta_{y,i}^v)],$$

$$\sum_{j=1}^{m_i^v} \gamma_{ij}^v \frac{\partial g_{ij}^v}{\partial h_{21}} \frac{\partial g_{ij}^v}{\partial h_{31}} = \rho_i^v(\psi_{y,i}^v - \phi_{213,i}^v \Gamma_{1,i}^v),$$

$$\sum_{j=1}^{m_i^v} \gamma_{ij}^v \frac{\partial g_{ij}^v}{\partial h_{31}} \frac{\partial g_{ij}^v}{\partial h_{31}} = \rho_i^v \psi_{1,i}^v.$$

The other entries of $$\sum_{j=1}^{m_i^h} \gamma_{ij}^h \frac{\partial g_{ij}^h}{\partial h_{pq}} \frac{\partial g_{ij}^h}{\partial h_{rs}}$$

and $$\sum_{j=1}^{m_i^v} \gamma_{ij}^v \frac{\partial g_{ij}^v}{\partial h_{pq}} \frac{\partial g_{ij}^v}{\partial h_{rs}}$$

are not shown as they are either 0 or differ from one of the above entries by $k_i^h$ or $k_i^v$.

One observation of the long list of variables from equations (1) to (4) is that the complexity of update only depends on the number of lines. This reduces the complexity of the processes that are performed to determine the actual mapping of the image on an objective plane to the captured image.

Aspects of the present invention may be applied to environments as well. For example, one may capture images with a camera having different levels of magnification. With each new level of magnification (or range of levels as determined by a developer), a homography between a captured image and an expected image may be performed. Here, the camera may photograph or otherwise obtain an image having roughly two sets of parallel lines. The sets of parallel lines may be used to determine a homography for a given level of magnification. For instance, the homography matrix may be stored in a memory of the camera and/or memory in a lens (if the lens has a memory) to be used to adjust a received image. As a user then changes the magnification for the camera, for example, a different homography matrix may be applied to the received image to transform it into a better image, reducing distortion present in the lens system and/or imaging system of the camera.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A process for determining a homography matrix by processing an image containing codes, the process comprising the steps of:
    extracting features from the image;
    determining four candidates for main directions of parallel lines within the image;
    identifying two pairs of near perpendicular directions from the four candidates;
    determining two main directions from the two pairs of near perpendicular directions;
    creating a homography matrix from the extracted features and from the two main directions, wherein the homography matrix is based on the parallel lines in the image, and the homography matrix attempts to minimize a distance between the features and the parallel lines;
    wherein the codes are EIC codes arranged in EIC symbols, and the creating step attempts to minimize distance between lines and the EIC codes such that $$g(H) = \frac{1}{2N} \sum_{i=1}^{m^h} \sum_{j=1}^{m_i^h} \gamma_{ij}^h (x_{ij}^h c_i^h + y_{ij}^h s_i^h + R_i^h)^2 + \frac{1}{2N} \sum_{i=1}^{m^v} \sum_{j=1}^{m_i^v} \gamma_{ij}^v (x_{ij}^v c_i^v + y_{ij}^v s_i^v + R_i^v)^2$$

is minimized where $$N = \sum_{i=1}^{m^h} m_i^h + \sum_{i=1}^{m^v} m_i^v,$$

N is the total number of effective EIC pattern pixels associated with all the lines, and $\gamma_{ij}^h$ and $\gamma_{ij}^v$ are weights; and
    wherein EICs are embedded interaction codes, H is a homography matrix, and each $c_i$, $s_i$, and $R_i$ are coefficients defining straight lines defining the two main directions determined from the near perpendicular directions.

2. The process according to claim 1, said extracting features step includes determining the rotation of said image.

3. The process according to claim 1, said extracting features step includes determining the scale of said image.

4. The process according to claim 1, said extracting features step includes determining the translation of said image.

5. The process according to claim 1, wherein said codes are EIC codes.

6. The process according to claim 1, wherein said parallel lines are formed by collections of dots.

7. The process according to claim 1, wherein said homography matrix is represented by the form:

$$H = \begin{pmatrix} h_{11} & h_{12} & h_{13} \\ h_{21} & h_{22} & h_{23} \\ h_{31} & h_{32} & h_{33} \end{pmatrix}.$$

8. The process according to claim 1, wherein repeated computation is minimized by introduction of intermediate variables.

9. The process according to claim 1, wherein a number of terms of said homography matrix are zero.

10. The process according to claim 1, wherein terms differ at most by two variables.

11. A system for processing an image containing codes comprising:
 an input receiving an image from a camera;
 a processor that processes the image, the processor extracting features from the image and segmenting the features;
 the processor determining four candidates for main directions of parallel lines within the image;
 the processor identifying two pairs of near perpendicular directions from the four candidates;
 the processor determining two main directions from the two pairs of near perpendicular directions;
 and an output receiving an output from the processor, the output including a homography matrix, wherein the homography matrix is based on the parallel lines in the image from the camera, and the homography matrix attempting to minimize a distance between the parallel lines and the extracted features;
 wherein the codes are EIC codes arranged in EIC symbols, and minimizing a distance attempts to minimize distance between lines and the EIC codes such that $$g(H) = \frac{1}{2N}\sum_{i=1}^{m^h}\sum_{j=1}^{m_i^h}\gamma_{ij}^h(x_{ij}^h c_i^h + y_{ij}^h s_i^h + R_i^h)^2 + \frac{1}{2N}\sum_{i=1}^{m^v}\sum_{j=1}^{m_i^v}\gamma_{ij}^v(x_{ij}^v c_i^v + y_{ij}^v s_i^v + R_i^v)^2$$

is minimized where $$N = \sum_{i=1}^{m^h} m_i^h + \sum_{i=1}^{m^v} m_i^v,$$

N is the total number of effective EIC pattern pixels associated with all the lines, and $\gamma_{ij}^h$ and $\gamma_{ij}^v$ are weights; and
 wherein EICs are embedded interaction codes, H is a homography matrix, and each $c_i$, $s_i$, and $R_i$, are coefficients defining straight lines defining the two main directions determined from the near perpendicular directions.

12. The system according to claim 11, wherein said homography matrix is of the form of:

$$H = \begin{pmatrix} h_{11} & h_{12} & h_{13} \\ h_{21} & h_{22} & h_{23} \\ h_{31} & h_{32} & h_{33} \end{pmatrix}.$$

13. The system according to claim 11, wherein repeated computation is minimized by introduction of intermediate variables.

14. The system according to claim 11, wherein a number of terms of said homography matrix are zero.

15. The system according to claim 11, wherein terms of said homography matrix differ at most by two variables.

16. A process for determining a homography for a camera comprising the steps of:
 obtaining an image having parallel lines;
 determining four candidates for main directions of parallel lines within the image;
 identifying two pairs of near perpendicular directions from the four candidates;
 determining two main directions from the two pairs of near perpendicular directions;
 determining a homography matrix for the camera, the homography matrix based on the parallel lines in the obtained image, where the homography matrix attempts to minimize a difference between the parallel lines in the obtained image and expected parallel lines; and
 applying the homography matrix to the obtained image to adjust the obtained image.

17. The process according to claim 16, wherein said homography matrix is stored for different ranges of magnification.

18. The process according to claim 16, wherein said homography matrix is of the form:

$$H = \begin{pmatrix} h_{11} & h_{12} & h_{13} \\ h_{21} & h_{22} & h_{23} \\ h_{31} & h_{32} & h_{33} \end{pmatrix}.$$

19. The process according to claim 16, wherein repeated computation is minimized by introduction of intermediate variables.

20. The process according to claim 16, wherein a number of terms of said homography matrix are zero.

21. The process according to claim 16, wherein terms of said homography matrix differ at most by two variables.

\* \* \* \* \*